United States Patent
Jung et al.

(10) Patent No.: US 12,518,664 B2
(45) Date of Patent: Jan. 6, 2026

(54) ELECTRONIC APPARATUS AND IMAGE OUTPUT METHOD

(71) Applicant: SAMSUNG ELECTRONICS CO., LTD., Suwon-si (KR)

(72) Inventors: Jingun Jung, Suwon-si (KR); Jiyeon Ma, Suwon-si (KR); Sungjun Hwang, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/659,953

(22) Filed: May 9, 2024

(65) Prior Publication Data

US 2024/0395182 A1 Nov. 28, 2024

Related U.S. Application Data

(63) Continuation of application No. PCT/KR2024/002288, filed on Feb. 22, 2024.

(30) Foreign Application Priority Data

May 24, 2023 (KR) .................. 10-2023-0067252

(51) Int. Cl.
G06V 20/40 (2022.01)
G09G 3/00 (2006.01)

(52) U.S. Cl.
CPC ......... *G09G 3/003* (2013.01); *G09G 2340/10* (2013.01); *G09G 2340/12* (2013.01)

(58) Field of Classification Search
CPC ........ G06V 20/20; G06V 20/40; G03B 31/00; G09G 5/00; G09G 3/00; G09G 3/003;

(Continued)

(56) References Cited

U.S. PATENT DOCUMENTS

| 7,623,114 B2 | 11/2009 | Rank |
| 8,441,437 B2 | 5/2013 | Rank |

(Continued)

FOREIGN PATENT DOCUMENTS

| CN | 110072047 A | 7/2019 |
| JP | 2007-272230 A | 10/2007 |

(Continued)

OTHER PUBLICATIONS

International Search Report (PCT/ISA/210) issued on May 27, 2024 by the International Searching Authority in International Patent Application No. PCT/KR2024/002288.

(Continued)

*Primary Examiner* — Chanh D Nguyen
*Assistant Examiner* — Nguyen H Truong
(74) *Attorney, Agent, or Firm* — Sughrue Mion, PLLC

(57) ABSTRACT

An electronic apparatus includes a display, a memory storing at least one instruction, and at least one processor. The at least one processor is configured to, by executing the at least one instruction, identify, based on a size of an audio signal corresponding to at least one image frame included in content being identified as greater than or equal to a threshold value, whether or not special effects are provided based on pixel information included in the at least one image frame, identify, based on identifying that the special effects are provided in the at least one image frame, image information corresponding to the special effects in the at least one image frame, and output a special effects image obtained based on the identified image information together with the at least one image frame through the display.

20 Claims, 29 Drawing Sheets

(58) Field of Classification Search
CPC .. G09G 3/32; G09G 3/34; G09G 3/36; G09G 2340/10; G09G 2340/12; G09G 11/60; G06T 5/00; G06T 7/11; G06T 7/70; G06T 7/194; G06T 13/80; G06T 19/00; G06F 3/16; G06F 3/048; G06F 3/0487; G06F 3/0481; G06F 3/0484; G06F 3/04815; G06F 16/71; G06F 16/68; G06F 16/78; G06F 16/683; G06F 16/738; G06F 16/783; G06F 9/24; A63F 13/25; A63F 13/52; A63F 13/54; A63F 13/65; A63F 13/5372; A63F 13/5255; A63F 13/424; G10L 15/08; G10L 15/26; G10L 19/00; G10L 21/003; G10L 21/10; G10L 21/14; G10L 25/51; H04R 3/00; H04R 29/00; G06K 9/00; G06K 9/20; G06K 9/62; H04N 5/57; H04N 5/60; H04N 5/262; H04N 5/225; H04N 5/228; H04N 7/08; G11B 27/031; G11B 27/34; G11B 27/00; G11B 27/028; G11B 27/036; G11B 27/30; H04B 10/116; H05B 37/02; G05B 15/02; G10H 1/00; G10H 1/36; H04M 1/00

See application file for complete search history.

(56) References Cited

U.S. PATENT DOCUMENTS

| | | | |
|---|---|---|---|
| 8,686,941 B2 | 4/2014 | Rank | |
| 10,636,385 B2 | 4/2020 | Jung et al. | |
| 11,183,151 B2 | 11/2021 | Jung et al. | |
| 11,366,375 B2 | 6/2022 | Chen et al. | |
| 11,409,794 B2 | 8/2022 | Shen et al. | |
| 11,563,902 B2 | 1/2023 | Kim et al. | |
| 11,644,650 B2 | 5/2023 | Kuo et al. | |
| 11,882,244 B2 | 1/2024 | Li et al. | |
| 12,073,625 B1* | 8/2024 | Sadoughi Nourabadi | G06V 20/46 |
| 2003/0067440 A1 | 4/2003 | Rank | |
| 2010/0066512 A1 | 3/2010 | Rank | |
| 2012/0188411 A1* | 7/2012 | Jang | H04N 5/2621 348/222.1 |
| 2013/0106691 A1 | 5/2013 | Rank | |
| 2014/0104293 A1 | 4/2014 | Li et al. | |
| 2015/0063451 A1* | 3/2015 | Zhu | H04L 65/70 375/240.09 |
| 2015/0278165 A1 | 10/2015 | Kim et al. | |
| 2016/0284050 A1 | 9/2016 | Kim et al. | |
| 2017/0154607 A1 | 6/2017 | Jung et al. | |
| 2017/0270363 A1* | 9/2017 | Polak | G06V 20/49 |
| 2018/0197578 A1* | 7/2018 | Ridder | G11B 27/031 |
| 2019/0080719 A1 | 3/2019 | Patry et al. | |
| 2020/0184927 A1 | 6/2020 | Jung et al. | |
| 2020/0409037 A1 | 12/2020 | Kuo et al. | |
| 2021/0271055 A1 | 9/2021 | Kuo et al. | |
| 2021/0271157 A1 | 9/2021 | Chen et al. | |
| 2022/0321802 A1 | 10/2022 | Li et al. | |
| 2022/0392130 A1 | 12/2022 | Sun et al. | |
| 2023/0021805 A1* | 1/2023 | Bonnevie | G06T 11/60 |
| 2024/0106968 A1 | 3/2024 | Li et al. | |

FOREIGN PATENT DOCUMENTS

| | | |
|---|---|---|
| JP | 2013-90095 A | 5/2013 |
| KR | 10-2009-0063675 A | 6/2009 |
| KR | 10-0925293 B1 | 11/2009 |
| KR | 10-1579229 B1 | 12/2015 |
| KR | 10-2016-0115214 A | 10/2016 |
| KR | 10-2017-0064261 A | 6/2017 |
| KR | 10-2148006 B1 | 8/2020 |
| KR | 10-2244248 B1 | 4/2021 |
| KR | 10-2022-0106848 A | 7/2022 |
| KR | 10-2022-0137067 A | 10/2022 |

OTHER PUBLICATIONS

Written Opinion (PCT/ISA/237) issued on May 27, 2024 by the International Searching Authority in International Patent Application No. PCT/KR2024/002288.

\* cited by examiner

ELECTRONIC APPARATUS AND IMAGE OUTPUT METHOD

CROSS-REFERENCE TO RELATED APPLICATIONS

This application is a continuation of International Application No. PCT/KR2024/002288 designating the United States, filed on Feb. 22, 2024, in the Korean Intellectual Property Receiving Office and claiming priority to Korean Patent Application No. 10-2023-0067252, filed on May 24, 2023, in the Korean Intellectual Property Office, the disclosures of each of which are incorporated by reference herein in their entireties.

BACKGROUND

1. Field

The disclosure relates to an electronic apparatus and an image output method, and more particularly, to an electronic apparatus which outputs content providing special effects and an image output method thereof.

2. Description of Related Art

Various types of electronic devices are being developed with continuing technological improvement. Specifically, display apparatuses which are used in various places such as homes, offices, public places, and the like have been under development continuously for several years.

Various methods for enhancing user experience of content for users are being researched. For example, recently, various special effects for enhancing immersiveness while providing a three-dimensional effect in various content such as game content and movie content are being provided.

SUMMARY

According to an aspect of the disclosure, an electronic apparatus may include: display; at least one memory storing at least one instruction; and at least one processor configured to control the electronic apparatus by being operatively connected with the and the at least one memory. The at least one processor is configured to execute the at least one instruction to: based on a size of an audio signal corresponding to at least one image frame of content being identified as greater than or equal to a threshold value, identify whether special effects are provided based on pixel information of the at least one image frame; based on identifying that the special effects are provided in the at least one image frame, identify image information corresponding to the special effects in the at least one image frame; and output a special effects image obtained based on the image information together with the at least one image frame through the display.

The at least one processor may be further configured to execute the at least one instruction to: based on the at least one image frame being displayed in a region smaller than a total area of the display, control the display to output the special effects image in a remaining region of the display excluding the region in which the at least one image frame is displayed.

The at least one processor may be further configured to execute the at least one instruction to: control the display to: provide a first display layer may include the at least one image frame; and provide a second display layer may include the special effects image at a rear end of the first display layer.

The at least one processor may be further configured to execute the at least one instruction to control the display to: provide a first display layer may include the at least one image frame; provide a third display layer may include a frame graphic at a front end of the first display layer; remove a background image outside the frame graphic from the at least one image frame; and provide a second display layer may include the special effects image at a front end of the third display layer.

The electronic apparatus further may include a user interface. The at least one processor may be further configured to execute the at least one instruction to: based on a user input being received through the user interface, identify whether the user input is associated with providing the special effects; and based on the user input being identified as associated with providing the special effects, identify whether the special effects are provided in the at least one image frame based on the user input.

The at least one processor may be further configured to execute the at least one instruction to: obtain color histogram information based on the pixel information; obtain histogram difference information by comparing the color histogram information with reference color histogram information; and identify at least one of whether the special effects are provided, or the image information, based on the histogram difference information.

The electronic apparatus further may include a speaker. The at least one processor may be further configured to execute the at least one instruction to: based on identifying that the special effects are provided in the at least one image frame, identify audio information corresponding to the special effects in the at least one image frame; and output special effects audio through the speaker based on the audio information.

The at least one processor may be further configured to execute the at least one instruction to: obtain at least one of whether the special effects are provided, the image information, or audio information corresponding to the special effects, by inputting the at least one image frame and the audio signal corresponding to the at least one image frame to a trained neural network model. The trained neural network model may be trained for at least one of whether the special effects are provided, the image information, or the audio information, to be obtained by learning the size of the audio signal and a change in color.

The at least one processor may be further configured to execute the at least one instruction to: identify whether the special effects are maintained or ended in at least one following frame based on a difference between the pixel information and pixel information of the at least one following frame; and identify a frame interval in which the special effects image is provided based on whether the special effects are maintained or ended.

The electronic apparatus further may include a communication interface. The at least one processor may be further configured to execute the at least one instruction to: transmit at least one of the image information, or audio information corresponding to the special effects, together with information on the content, to an external apparatus through the communication interface. The information on the content may include identification information on the content and information on a playback time-point at which the special effects are provided.

According to an aspect of the disclosure, an image output method of an electronic apparatus, may include: based on a size of an audio signal corresponding to at least one image frame of content being identified as greater than or equal to a threshold value, identifying whether special effects are provided based on pixel information of the at least one image frame; based on identifying that the special effects are provided in the at least one image frame, identifying image information corresponding to the special effects in the at least one image frame; and outputting a special effects image obtained based on the image information together with the at least one image frame.

The outputting together with the at least one image frame may include: based on the at least one image frame being displayed in a region smaller than a total area of the display, outputting the special effects image in a remaining region of the display excluding the region in which the at least one image frame is displayed.

The outputting together with the at least one image frame may include: providing a first display layer may include the at least one image frame; and providing a second display layer may include the special effects image displayed at a rear end of the first display layer.

The outputting together with the at least one image frame may include: providing a first display layer may include the at least one image frame; providing a third display layer may include a frame graphic at a front end of the first display layer; removing a background image outside the frame graphic from the at least one image frame; and providing a second display layer may include the special effects image at a front end of the third display layer.

According to an aspect of the disclosure, a non-transitory computer-readable medium configured to store computer instructions for an electronic apparatus to perform an operation when executed by a processor of the electronic apparatus, the operation may include: based on a size of an audio signal corresponding to at least one image frame of content being identified as greater than or equal to a threshold value, identifying whether special effects are provided based on pixel information of the at least one image frame; based on identifying that the special effects are provided in the at least one image frame, identifying image information corresponding to the special effects in the at least one image frame; and outputting a special effects image obtained based on the image information together with the at least one image frame.

The outputting together with the at least one image frame may include: based on the at least one image frame being displayed in a region smaller than a total area of the display, outputting the special effects image in a remaining region of the display excluding the region in which the at least one image frame is displayed.

The outputting together with the at least one image frame may include: providing a first display layer may include the at least one image frame; and providing a second display layer may include the special effects image at a rear end of the first display layer.

The outputting together with the at least one image frame may include: providing a first display layer may include the at least one image frame; providing a third display layer may include a frame graphic at a front end of the first display layer; removing a background image outside the frame graphic from the at least one image frame; and providing a second display layer may include the special effects image at a front end of the third display layer.

The operation further may include: obtaining color histogram information based on the pixel information; obtaining histogram difference information by comparing the color histogram information with reference color histogram information; and identifying at least one of whether the special effects are provided, or the image information, based on the histogram difference information.

The operation further may include obtaining at least one of whether the special effects are provided, the image information, or audio information corresponding to the special effects, by inputting the at least one image frame and the audio signal corresponding to the at least one image frame to a trained neural network model. The trained neural network model is trained for at least one of whether the special effects are provided, the image information, or the audio information, to be obtained by learning the size of the audio signal and a change in color.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
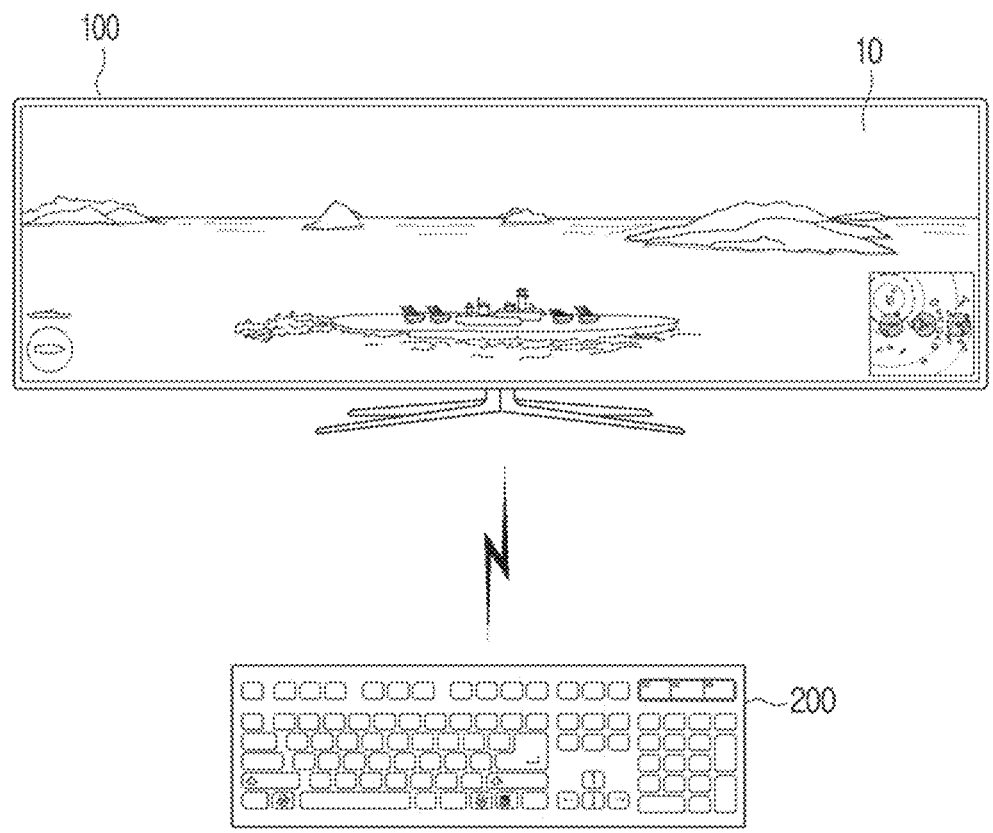
FIG. 1A is a diagram schematically illustrating an electronic apparatus according to one or more embodiments of the disclosure.

The embodiments of disclosure will be described in detail below with reference to the accompanying drawings.

Terms used in the disclosure will be briefly described, and the disclosure will be described in detail.

The terms used in describing the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

Terms such as "first," and "second" may be used in describing various elements, but the elements are not to be limited by the terms. The terms may be used only to distinguish one element from another.

A singular expression includes a plural expression, unless otherwise specified. In the disclosure, it is to be understood that the terms such as "have," "form," or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Expressions, "at least one of A and B" and "at least one of A or B" and "at least one of A or B" should be interpreted to mean any one of "A" or "B" or "A and B." As another example, "performing at least one of steps 1 and 2" or "performing at least one of steps 1 or 2" means the following three juxtaposition situations: (1) performing step 1; (2) performing step 2; (3) performing steps 1 and 2.

Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

Embodiments of the disclosure will be described in detail with reference to the accompanying drawings to aid in the understanding of those of ordinary skill in the art. However, the disclosure may be implemented in various different forms and is not limited to the embodiments described herein. Further, in the drawings, parts not relevant to the description may be omitted, and like reference numerals may be used to indicate like elements.

One or more embodiments of the disclosure will be described in greater detail below with reference to accompanied drawings.

Figure 1B:
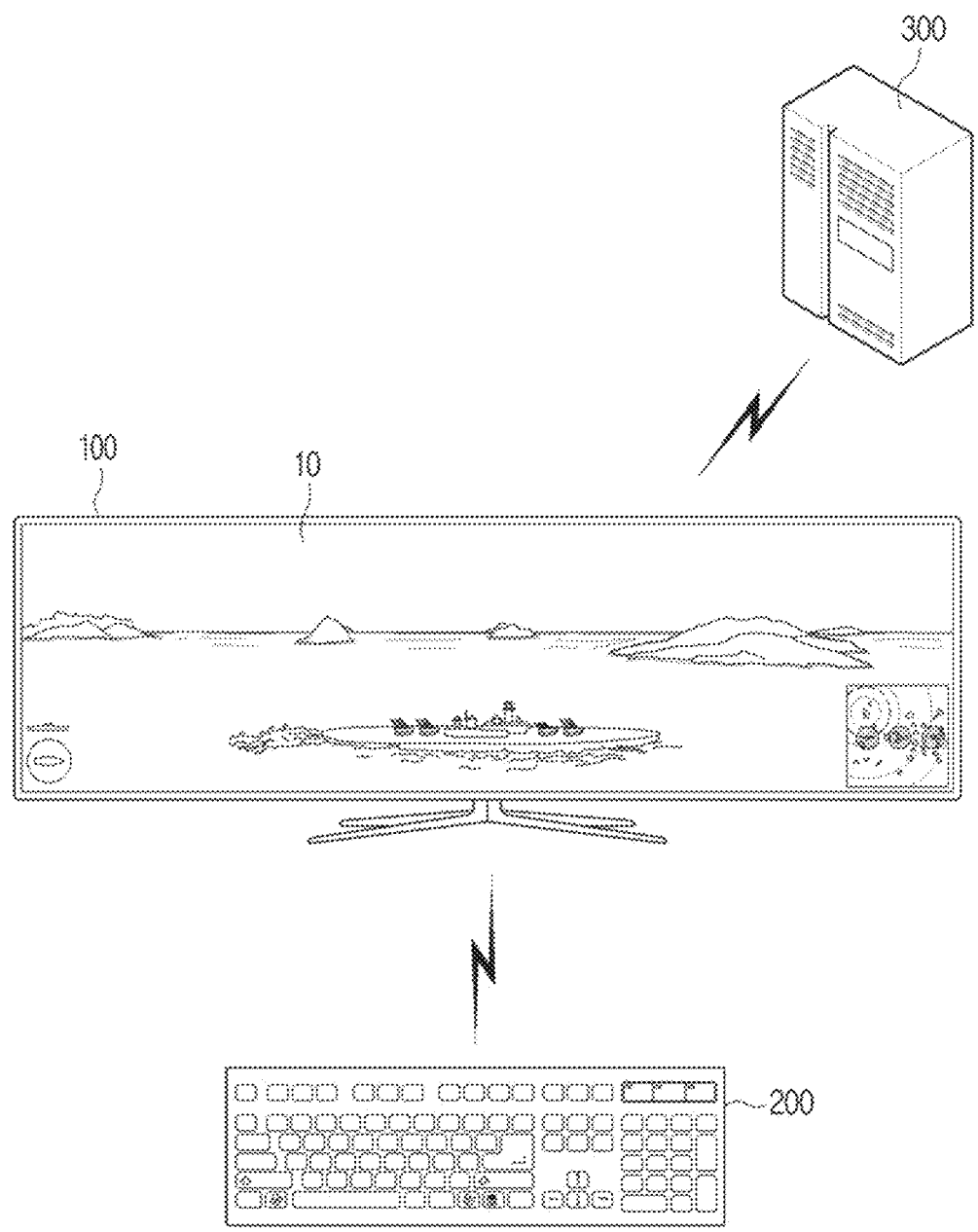
FIG. 1B is a diagram schematically illustrating an electronic apparatus according to one or more embodiments of the disclosure.

FIG. 1A and FIG. 1B are diagrams illustrating schematically an electronic apparatus according to one or more embodiments of the disclosure.

Referring to one or more examples shown in FIG. 1A, an electronic apparatus 100 may be implemented as various apparatuses which include a display function such as, for example, and without limitation, a monitor, a smart monitor, a smart television (TV), an electronic frame, an electronic blackboard, an electronic table, a notebook, a digital signage, a digital information display (DID), a video wall, a projector, a tablet personal computer (PC), and the like.

According to one or more examples, the electronic apparatus 100 may perform communication with an input device 200. The input device 200 may be implemented as not only a keyboard as shown therein, but also as a device such as a joystick, a button input device, a wheel input device, a touchpad, or a mouse. However, the above is not limited thereto, and the input device 200 may be implemented as a touch screen provided in the electronic apparatus 100 through which a display function and an operation input function may be performed together.

Referring to one or more examples shown in FIG. 1B, the electronic apparatus 100 may be an apparatus pre-registered in a server 300. For example, the server 300 may manage information on not only the electronic apparatus 100 but also on content provided from other electronic apparatuses. For example, the electronic apparatus 100 may transmit information associated with special effects within content (which will be described below) to the server 300, and the server 300 may store and manage the received information. For example, the server 300 may transmit information associated with providing special effects to other electronic apparatuses based on the stored information. The server 300 may be implemented as a cloud server, but is not limited thereto.

Various embodiments of identifying special effects information within content provided from the electronic apparatus 100, and enhancing special effects to increase immersiveness and/or a three-dimensional effect (and providing the same) will be described below.

Figure 2:
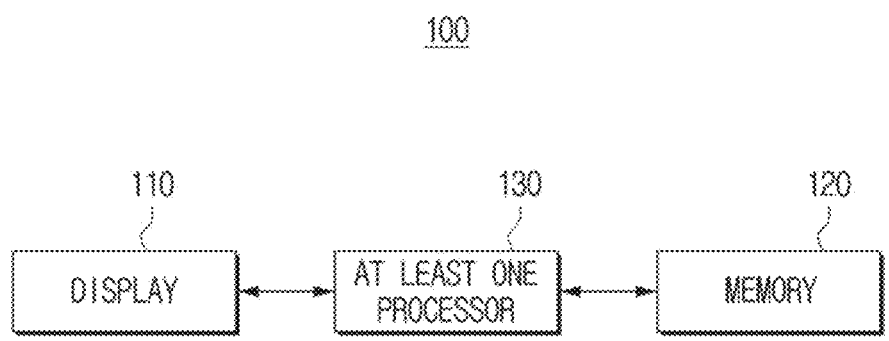
FIG. 2 is a block diagram illustrating a configuration of an electronic apparatus according to one or more embodiments.

FIG. 2 is a block diagram illustrating a configuration of an electronic apparatus according to one or more embodiments.

Referring to FIG. 2, the electronic apparatus 100 may include at least one display 110, at least one memory 120, and at least one processor 130.

The (at least one) display 110 may be implemented as a display including self-emissive devices or a display including non-emissive devices and a backlight. For example, the display 110 may be implemented as a display of various types such as, for example, and without limitation, a liquid crystal display (LCD), an organic light emitting diode (OLED) display, a light emitting diodes (LED), a micro LED, a mini LED, a plasma display panel (PDP), a quantum dot (QD) display, a quantum dot light emitting diodes (QLED), or the like. In the display 110, a driving circuit, which may be implemented in the form of an amorphous silicon (a-si) TFT, a low temperature poly silicon (LTPS) TFT, an organic TFT (OTFT), or the like, a backlight unit, and the like may be included. According to one or more examples, at a front surface of the display 110, a touch sensor configured to sense a touch operation having a form such as, for example, and without limitation, a touch film, a touch sheet, a touchpad, or the like may be disposed and implemented to sense touch inputs of various types. For example, the display 110 may be configured to sense touch inputs of various types such as, for example, and without limitation, a touch input by a user hand, a touch input by an input device such as a Stylus Pen, a touch input by a specific capacitive material, or the like. Here, the input device may be implemented into an input device in pen form which may be designated to various terms such as, an electronic pen, a Stylus Pen, or an S-Pen. According to one or more examples, the display 110 may be implemented as a flat display, a curved display, a foldable and/or rollable flexible display, or the like.

The (at least one) memory 120 may be configured to store data necessary for the various embodiments. The memory 120 may be implemented in a memory form embedded in the electronic apparatus 100 according to a data storage use, or implemented in a memory form attachable to or detachable from the electronic apparatus 100. For example, data for driving the electronic apparatus 100 may be stored in a memory embedded in an electronic apparatus 100, and data for an expansion function of the electronic apparatus 100 may be stored in the memory attachable to or detachable from the electronic apparatus 100. Meanwhile, the memory embedded in the electronic apparatus 100 may be implemented as at least one of a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard drive, or a solid state drive (SSD)). In addition, a memory attachable to or detachable from the electronic apparatus 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The at least one processor 130 may be configured to control the overall operation of the electronic apparatus 100. Specifically, the at least one processor 130 may be configured to control the overall operation of the electronic apparatus 100 by being connected with each configuration of the electronic apparatus 100. For example, the at least one processor 130 may be configured to control the overall operation of the electronic apparatus 100 by being electrically connected with the display 110 and the memory 120. The processor 130 may be formed of one or a plurality of processors.

The at least one processor 130 may perform, by executing at least one instruction stored in the memory 120, an operation of the electronic apparatus 100 according to the various embodiments.

The at least one processor 130 may include at least one of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 130 may control one or a random combination of other elements of the electronic apparatus, and perform an operation associated with communication or data processing. The at least one processor 130 may execute at least one program or instruction stored in the memory. For example, the at least one processor may perform, by executing at least one instruction stored in the memory, a method according to one or more embodiments of the disclosure.

When a method according to one or more embodiments of the disclosure includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 130 may be implemented as a single core processor that includes one core, or as at least one multicore processor that includes a plurality of cores (e.g., a homogeneous multicore or a heterogeneous multicore). If the at least one processor 130 is implemented as a multicore processor, each of the plurality of cores included in the multicore processor may include a memory inside the processor such as a cache memory and an on-chip memory, and a common cache shared by the plurality of cores may be included in the multicore processor. In addition, each of the plurality of cores (or a portion of the plurality of cores) included in the multicore processor may independently read and perform a program command for implementing a method according to one or more embodiments, or read and perform a program command for implementing a method according to one or more embodiments of the disclosure due to a whole (or a portion) of the plurality of cores being interconnected.

When a method according to one or more embodiments of the disclosure include a plurality of operations, the plurality of operations may be performed by one core of the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to the embodiments of the disclosure, the processor may refer to a system on chip (SoC), a single core processor, or a multicore processor in which the at least one processor and other electronic components are integrated or a core included in the single core processor or the multicore processor, and the core herein may be implemented as the CPU, the GPU, the APU, the MIC, the NPU, the hardware accelerator, the machine learning accelerator, or the like, but is not limited to the embodiments of the disclosure. However, for convenience of description, the at least one processor 130 will be designated below as the processor 130.

Figure 3:
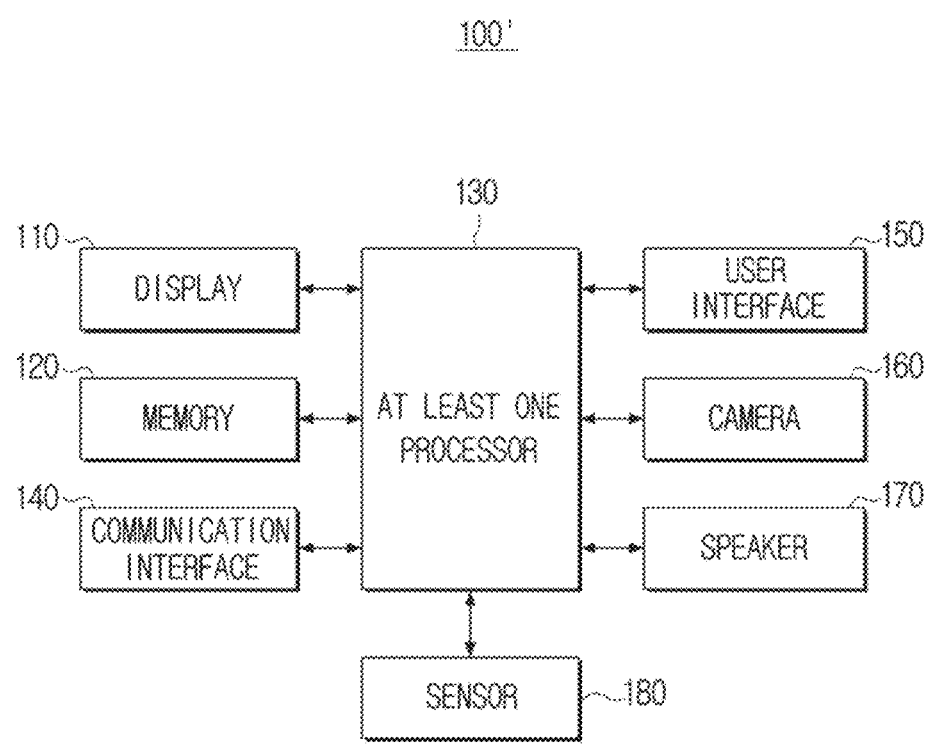
FIG. 3 is a block diagram illustrating a detailed configuration of an electronic apparatus according to one or more embodiments.

FIG. 3 is a block diagram illustrating a detailed configuration of an electronic apparatus according to one or more embodiments.

Referring to FIG. 3, the electronic apparatus 100' may include the display 110, the memory 120, the at least one processor 130, a communication interface 140, a user interface 150, a camera 160, a speaker 170, and a sensor 180.

The communication interface 140 may be implemented in various interfaces according to one or more embodiments of the electronic apparatus 100'. For example, the communication interface 140 may perform communication with an external apparatus, an external storage medium (e.g., a USB memory) an external server (e.g., WEBHARD), and the like through communication methods such as, for example, and without limitation, Bluetooth, an AP-based Wi-Fi (a Wireless LAN network), Zigbee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), an optical, a coaxial, or the like.

The user interface 150 may be implemented in a device such as a button, a touchpad, a mouse, and a keyboard, or implemented as a touch screen or the like capable of performing the above-described display function and the operation input function together.

The camera 160 may be turned-on according to a pre-set event and perform capturing. The camera 160 may convert a captured image to an electric signal and generate image data based on the converted signal. For example, a subject may be converted to an electric image signal through a semiconductor optical device (a charged coupled device (CCD)), and the converted image signal as described above may be signal processed after being amplified and converted to a digital signal. For example, the camera 160 may be implemented as a generic camera, a stereo camera, a depth camera, or the like.

The speaker 170 may be a configuration which outputs not only various audio data, but also various notification sounds, voice messages, or the like. The processor 130 may control the speaker 170 to output feedback or various notifications according to the various embodiments of the disclosure in audio form.

The sensor 180 may include sensors of various types such as, for example, and without limitation, a touch sensor, a proximity sensor, an acceleration sensor (or a gravity sensor), a geomagnetic sensor, a gyro sensor, a pressure sensor, a position sensor, a distance sensor, an illuminance sensor, and the like.

In addition thereto, the electronic apparatus 100' may include a microphone, a tuner, a demodulator, and the like according to one or more embodiments.

The microphone may be a configuration for receiving input of a user voice or other sounds and converting to audio data. However, according to another embodiment, the electronic apparatus 100' may receive the user voice input through an external apparatus through the communication interface 140.

The tuner may receive a radio frequency (RF) broadcast signal by tuning a channel selected by a user from the RF broadcast signals received through an antenna or all pre-stored channels.

The demodulator may perform demodulation, channel decoding, and the like by receiving a digital IF (DIF) signal converted from the tuner.

Figure 4:
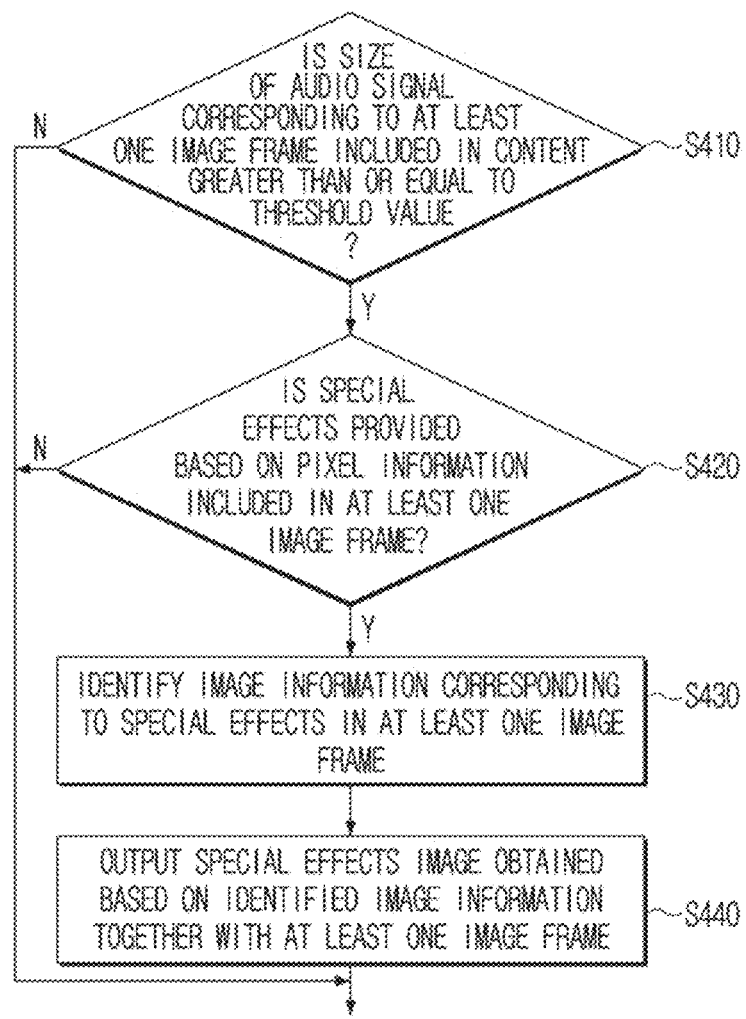
FIG. 4 is a flowchart illustrating an image output method of an electronic apparatus according to one or more embodiments.

FIG. 4 is a flowchart illustrating an image output method of an electronic apparatus according to one or more embodiments.

According to one or more embodiments, the processor 130 may identify whether a size of an audio signal corresponding to at least one image frame include in content is greater than or equal to a threshold value (S410).

The processor 130 may identify, based on the size of the audio signal corresponding to the at least one image frame included in the content being identified as greater than or equal to the threshold value (S410: Y), whether or not special effects are provided based on pixel information included in the at least one image frame (S420).

Here, special effects may be an effect used in industries of film, television, theater, video game, and simulator to simulate an event imaginable in a story or a virtual word, and may be represented abbreviated as SFX and SPFX, or even FX. For example, special effects may include visual special effects and/or auditory special effects. For example, the visual special effects may include a digital technique of all types which is based on computer graphics (CG).

According to one or more examples, the threshold value for identifying whether or not special effects are provided may be a size of an average audio signal in a relevant content. In one or more examples, the threshold value may be determined as an average size of an audio signal which is played back to date. In this case, the threshold value may be continuously updated over time. In another example, the threshold value for identifying whether or not special effects are provided may be a default value included in metadata and the like of content.

According to one or more examples, the processor 130 may analyze, based on an audio signal having a size greater than or equal to the threshold value being identified, pixel information of the at least one image frame corresponding to an identified time-point and identify whether or not special effects are provided based on the analysis result.

The processor 130 may identify, based on identifying that the special effects are provided in the at least one image frame (S420: Y), image information corresponding to the special effects in the at least one image frame (S430). According to one or more examples, the processor 130 may identify a pixel value and a pixel position corresponding to the identified special effects in the image frame as image information corresponding to the special effects.

The processor 130 may perform a special effects enhancement processing by outputting a special effects image (or a special effects graphic image) obtained based on the identified image information together with the at least one image frame (S440). According to one or more examples, the processor 130 may output a special effects image frame and an original image frame as different display layers from each other based on the pixel value and pixel position corresponding to the special effects. For example, the original image frame may be output as a first display layer, and the special effects image may be output as a second display layer at a rear end of the first display layer.

FIG. 5A to FIG. 5D are diagrams illustrating an identification method of whether or not special effects are provided according to one or more embodiments.

According to one or more embodiments, the processor 130 may identify a feature point associated with an occurrence of special effects in an audio signal of content according to various methods. In one or more examples, the processor 130 may identify, based on a feature point which can predict the occurrence of special effects being identified from the audio signal, whether or not special effects are provided in the image frame. In another example, the processor 130 may reduce delay by predicting in advance the feature point by using a parameter obtained in an audio decoding process.

Figure 5A:
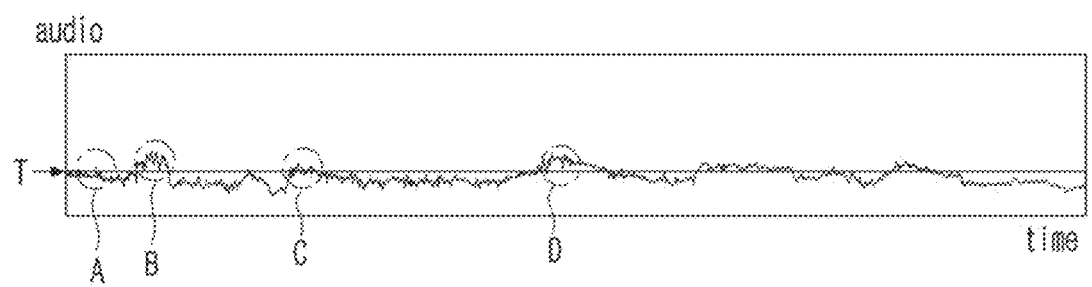
FIG. 5A is a diagram illustrating an identification method of whether or not special effects are provided according to one or more embodiments.

According to one or more embodiments, the processor 130 may identify whether an audio signal of a size greater than or equal to a threshold value T is identifiable in an audio signal of content as shown in FIG. 5A. For example, in FIG. 5A, a size of the audio signal at an A time-point may be less than the threshold value, but it may be verified that the size of the audio signal at a B time-point, a C time-point, and a D time-point has been identified as greater than or equal to the threshold value.

Figure 5B:
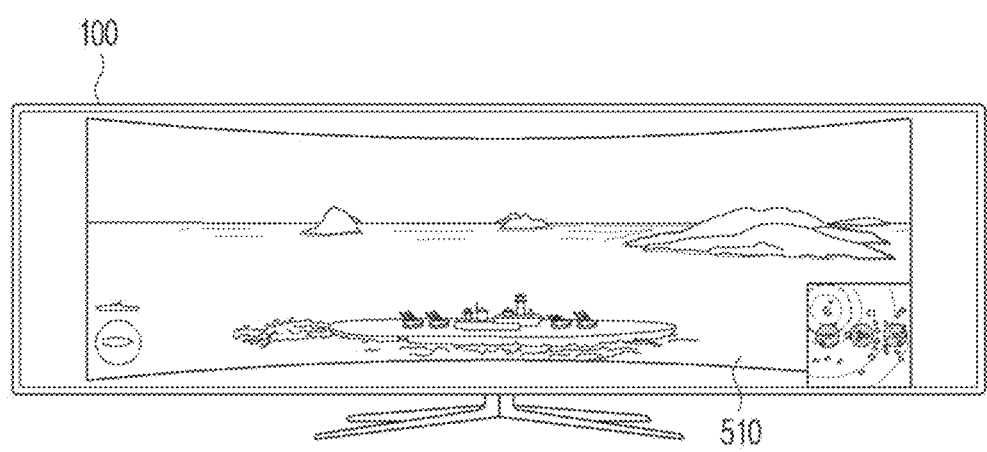
FIG. 5B is a diagram illustrating an identification method of whether or not special effects are provided according to one or more embodiments.

FIG. 5B may show a state in which special effects are not provided to an image frame 510 corresponding to the A time-point at which the size of the audio signal is less than the threshold value T. According to one or more examples, the processor 130 may not determine, in the case of the image frame shown in FIG. 5B, whether or not special effects are provided in the corresponding image frame because the corresponding size of the audio signal is less than the threshold value T.

Figure 5C:
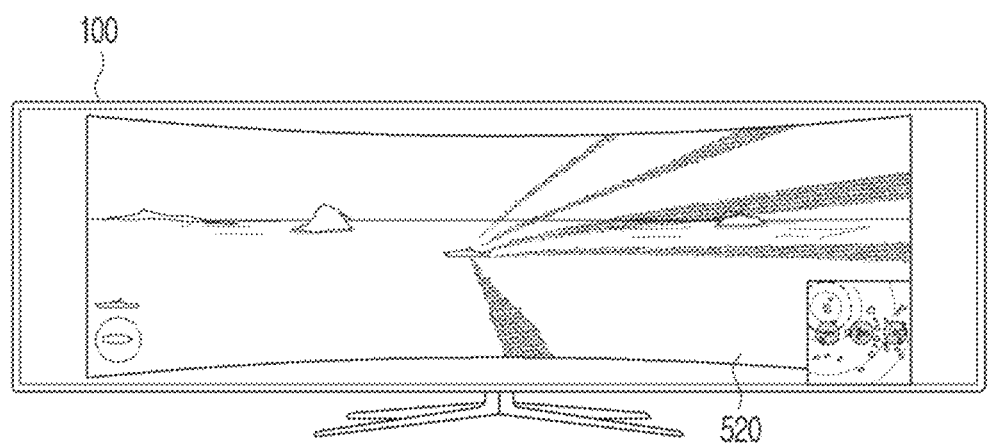
FIG. 5C is a diagram illustrating an identification method of whether or not special effects are provided according to one or more embodiments.

FIG. 5C shows a state in which missile special effects are provided to an image frame 520 corresponding to the B time-point at which the size of the audio signal is greater than or equal to the threshold value T. According to one or more examples, the processor 130 may determine, in the case of the image frame shown in FIG. 5C, whether or not special effects are provided in the corresponding image frame because the corresponding size of the audio signal is greater than or equal to the threshold value T.

Figure 5D:
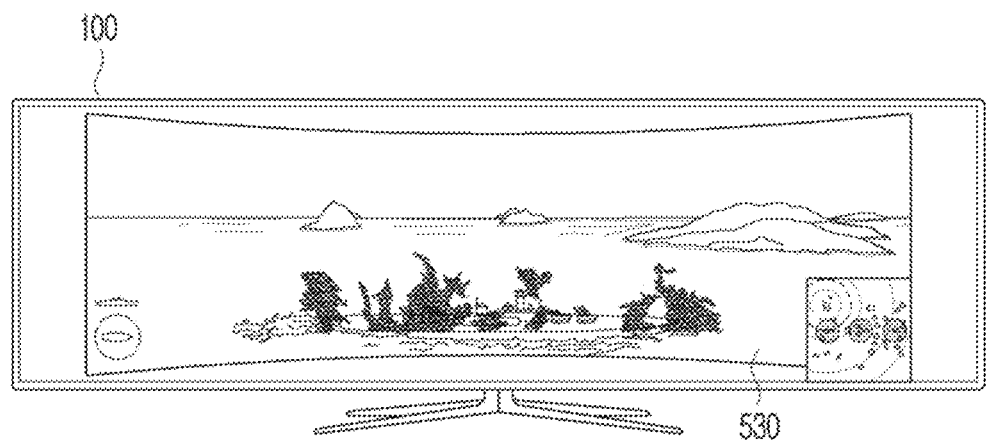
FIG. 5D is a diagram illustrating an identification method of whether or not special effects are provided according to one or more embodiments.

FIG. 5D may show a state in which flame special effects are being provided to an image frame 530 corresponding to the D time-point at which the size of the audio signal is greater than or equal to the threshold value T. According to one or more examples, the processor 130 may determine, in the case of the image frame shown in FIG. 5D, whether or not special effects are provided in the corresponding image frame because the corresponding size of the audio signal is greater than or equal to the threshold value T.

According to one or more embodiments, the processor 130 may identify, based on an audio signal of a size which is suddenly increased to greater than or equal to a pre-set size compared to an average size of a pre-set time period recently being identified from the audio signal of the content, whether or not special effects are provided in the corresponding image frame. For example, if an audio signal which is suddenly increased to greater than or equal to 10 DB compared to an average size (DB) for 1 second recently being identified, whether or not special effects are provided may be identified from the corresponding image frame.

According to one or more embodiments, the processor 130 may identify, based on an audio signal of a pre-set type being identified from the audio signal of the content, whether or not special effects are provided may be identified from the corresponding image frame.

For example, the processor 130 may identify, based on a pre-stored sound associated with the special effects being identified from the audio signal of the content, whether or not special effects are provided from the corresponding image frame. For example, when the pre-stored sound associated with the special effects such as a missile, a gun, a knife, a scream, a thunder, and the like is identified, whether or not special effects are provided may be identified from the corresponding image frame.

According to one or more embodiments, the processor 130 may identify, based on directionality of sound being identified from the audio signal of the content, whether or not special effects are provided from the corresponding image frame. For example, the processor 130 may identify, based on the directionality of sound being identified such as left→right, top→bottom, and the like, whether or not special effects are provided from the corresponding image frame.

The processor 130 may detect, based on the feature point of the audio signal being detected according to the above-described various methods, a feature point of a video signal. That is, the processor 130 may identify whether or not special effects are provided in the corresponding image frame when the providing of special effects is predicted from the audio signal.

According to one or more examples, the processor 130 may identify a feature point showing the provision of special effects based on at least one of a change in color histogram, a size of a region which is different by greater than or equal to a pre-set saturation value compared to a surrounding region, and time in maintaining the corresponding region. For example, processor 130 may identify that the special effects are provided if a region in which the saturation is different by x compared to the surrounding regions is x pixel or greater than or equal to 1/n of a whole screen size, and the corresponding region is maintained for greater than or equal to 0.5 sections.

Meanwhile, the processor 130 may reduce a delay by predicting whether or not the special effects are provided by using a parameter obtained in a decoding process of a compressed image of a specific compression method (e.g., MPEG/H.264, etc.)

Figure 6:
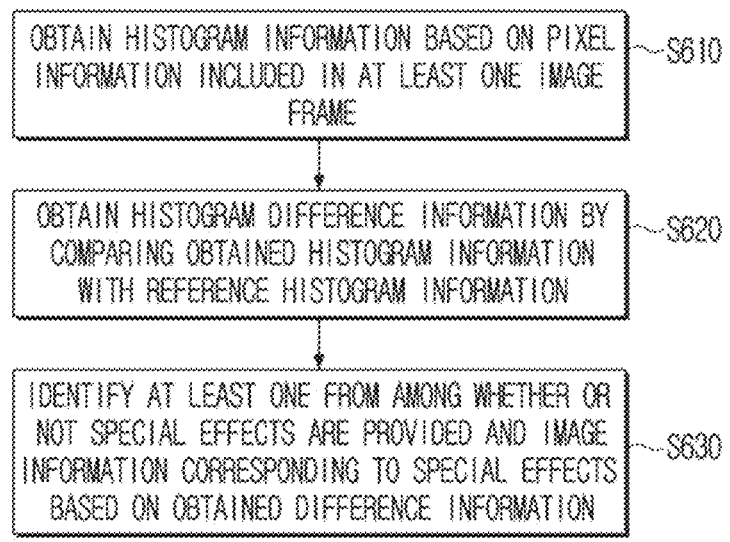
FIG. 6 is a flowchart illustrating an identification method of whether or not special effects are provided according to one or more embodiments.

FIG. 6 is a flowchart illustrating an identification method of whether or not special effects are provided according to one or more embodiments.

According to one or more embodiments, the processor 130 may obtain color histogram information based on pixel information included in at least one image frame (S610). The color histogram may be information representing a distribution of contrast levels with respect to pixels within an image, and in the color histogram, a horizontal axis may represent contrast levels of a 256-gray-level image and a vertical axis may represent a frequency of each contrast level, and a high frequency may be shown as the level increases higher. Because the above-described histogram intuitively shows whether or not the contrast level is uniformly distributed or is distributed more toward one side, whether or not there is occurrence of special effects may be easily identified.

The processor 130 may obtain histogram difference information by comparing the obtained color histogram information with reference color histogram information (S620). According to one or more examples, the reference color histogram information may be an average color histogram of the corresponding content. For example, the reference color histogram information may be an average histogram value of an image frame which has been played back to date. In this case, the reference color histogram information may be continuously updated over time.

The processor 130 may identify at least one of whether or not special effects are provided, and image information corresponding to the special effects, based on the obtained difference information (S630). According to one or more examples, the processor 130 may identify that the special effects are provided based on the obtained difference information being greater than or equal to the threshold value. Because colors corresponding to the special effects are emphasized, a histogram difference value may be identified as greater than or equal to the threshold value in case the special effects are provided. Here, the threshold value may be set to a different value according to a type of content (e.g., game content, film content, etc.) or a detailed type of the content (e.g. a role-playing game, a shooting game, a simulation game, an action game, a puzzle game, an adventure game, etc.). The threshold value may be pre-set, or set or updated based on a playback frame.

Figure 7A:
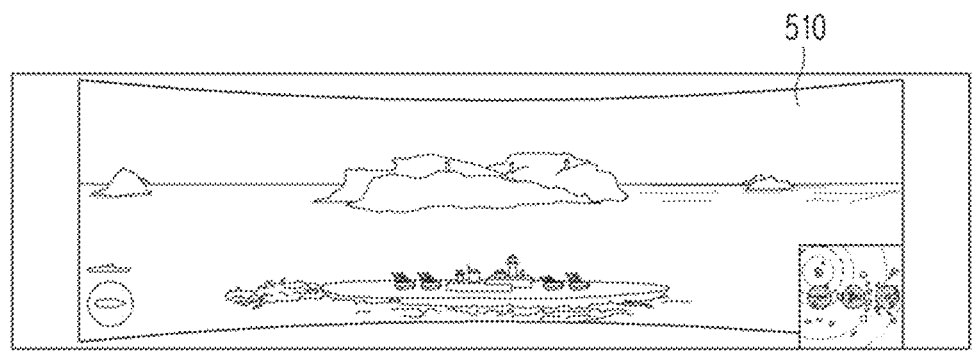
FIG. 7A is a diagram illustrating an identification method of whether or not special effects are provided according to one or more embodiments.
Figure 7B:
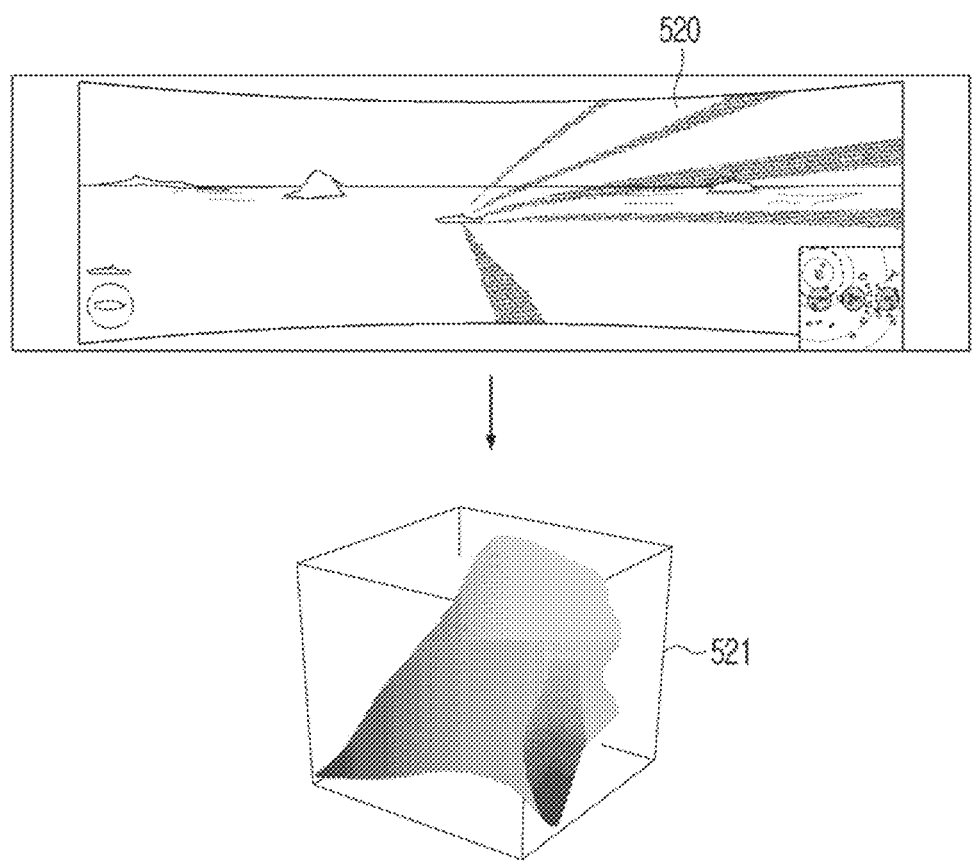
FIG. 7B is a diagram illustrating an identification method of whether or not special effects are provided according to one or more embodiments.
Figure 7C:
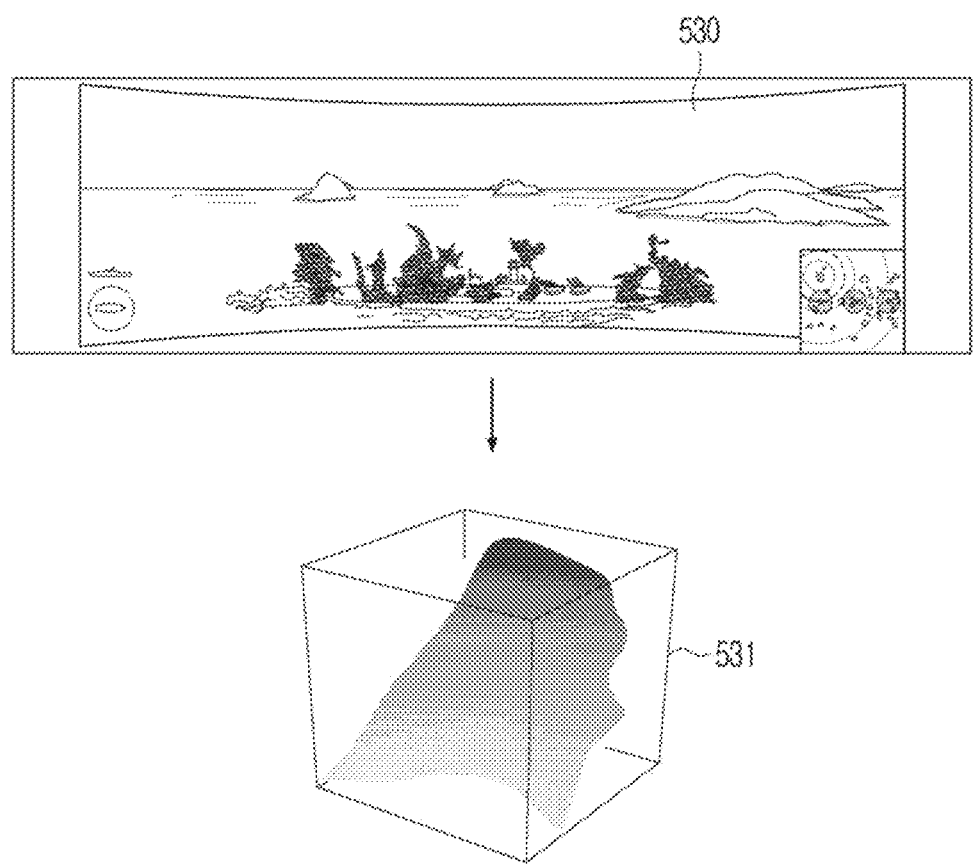
FIG. 7C is a diagram illustrating an identification method of whether or not special effects are provided according to one or more embodiments.

FIG. 7A to FIG. 7C are diagrams illustrating an identification method of whether or not special effects are provided according to one or more embodiments.

According to one or more embodiments, the processor 130 may obtain a color histogram 511 of the image frame 510 as shown in FIG. 7A. In this case, the processor 130 may obtain a difference value by comparing the obtained color histogram 511 with a reference histogram, and identify that the special effects are not provided if the difference value is less than a first threshold value. Alternatively, the processor 130 may obtain a similarity value by comparing the obtained color histogram 511 with the reference histogram, and identify that the special effects are not provided if the similarity value is greater than or equal to a second threshold value.

Then, the processor 130 may obtain a color histogram 521 of the following image frame 520 as shown in FIG. 7B. In this case, the processor 130 may obtain a difference value by comparing the obtained color histogram 521 with the reference histogram, and identify that the special effects are provided if the difference value is greater than or equal to the first threshold value. Alternatively, the processor 130 may obtain a similarity value by comparing the obtained color histogram 521 with the reference histogram, and identify that the special effects are provided if the similarity value is less than the second threshold value.

Then, the processor 130 may obtain a color histogram 531 of the following image frame 530 as shown in FIG. 7C. In this case, the processor 130 may obtain a difference value by comparing the obtained color histogram 531 with the reference histogram, and identify that the special effects are provided if the difference value is greater than or equal to the first threshold value. Alternatively, the processor 130 may obtain a similarity value by comparing the obtained color histogram 521 with the reference histogram, and identify that the special effects are provided if the similarity value is less than the second threshold value.

According to one or more examples, the first threshold value and/or the second threshold value in FIG. 7B and FIG. 7C may be a same value as the first threshold value and/or the second threshold value described in FIG. 7A. For example, the first threshold value and/or the second threshold value may be set to a default value within the same content. However, according to another example, the first threshold value and/or the second threshold value may be a value different from the first threshold value and/or the second threshold value described in FIG. 7A. For example, the first threshold value and/or the second threshold value within the same content may be set to an average value (e.g., an average value of image frames in which the special effects are not provided) of image frames played back to date, and updated according to a number of image frames being played back increasing.

Meanwhile, the processor 130 may obtain, based on identifying that the special effects are provided in the image frame, special effects image information based on a color region corresponding to the special effects. According to one or more examples, the processor 130 may generate a special effects image frame by cropping the color region corresponding to the special effects. According to another example, the processor 130 may generate a special effects image frame based on coordinate information of color pixels corresponding to the special effects. According to another example, the processor 130 may use a pre-stored special effects image frame. For example, image frames associated with special effects such as a missile, a gun, a knife, a scream, thunder, and the like may be pre-stored in the memory 120, and the processor 130 may use the pre-stored special effects image frames.

According to one or more examples, the processor 130 may provide a final output image based on the original image frame (or, a frame including a size reduced image region) and the special effects image frame. For example, the processor 130 may provide the final output image by outputting the final output image through different display layers based on the original image frame (or the frame including the size reduced image region) and the special effects image frame. In other words, the at least one processor 130 may, based on the original image frame being displayed in a region smaller than a total area of the display, control the display to output the special effects image in a remaining region of the display excluding the region in which the original image frame is displayed.

According to another example, the processor 130 may obtain the final output image by combining the special effects image information to the original image frame (or, the frame including the size reduced image region). For example, the processor 130 may provide the final output image by substituting the pixel values of the region corresponding to the special effects in the original image frame (or the frame including the size reduced image region) with the updated pixel values based on the special effects image information.

According to one or more examples, the processor 130 may obtain an output image included with the special effects image at a border region other than the image region from the frame including the size reduced image region. Here, the frame including the size reduced image region may be a frame in which pixels of the region other than the image region, that is, the border region have no specific pixel value.

For example, if the size reduced image region is enlarged by a screen size of the display 110, an output image including the special effects image corresponding to the size reduced image region and the border region may be obtained because the special effects image corresponding to the border region may be obtained. For example, after enlarging the size reduced image region by the screen size of the display 110, the special effects image corresponding to the border region may be obtained by cropping the special effects image corresponding to the border region in the enlarged image.

According to another example, the processor 130 may provide an output image in a form enhancing pixel values in a specific region in the original image frame (i.e., an image frame which is not reduced in size). The specific region may include the border region (or an edge region), a center region, and the like. The border region may include at least one region of upper, lower, left, and right border regions. Here, the enhancing the pixel values may be an adjustment in the form of increasing brightness value, saturation value, and the like of pixels values in the border region.

According to one or more embodiments, the processor 130 may identify whether to maintain or end the special effects enhancement processing in at least one following frame based on a difference between the pixel information included in the at least one image frame and the pixel information included in the at least one following frame.

Then, the processor 130 may identify a frame interval in which the special effects enhancement processing is provided based on whether to maintain or end the identified special effects. For example, the processor 130 may identify, if a frame in which the special effects are ended is identified, a frame in which the special effects enhancement processing is ended with respect to the frame in which the special effects are ended based on a level of special effect, a type of special effect, and the like. For example, the processor 130 may determine a previous frame playback time-point of a threshold number and/or a following frame playback time-point of a threshold number as the frame in which the special effects enhancement processing is ended based on the frame in which the special effects are ended.

According to one or more examples, the processor 130 may maintain the special effects enhancement processing if the difference between the pixel information included in the at least one image frame and the pixel information included in the at least one following frame is less than a pre-set value. In addition, the processor 130 may end the special effects enhancement processing if the difference between the pixel information included in the at least one image frame and the pixel information included in the at least one following frame is greater than or equal to the pre-set value. For example, the processor 130 may maintain the special effects enhancement processing if a difference in average value of an image frame which belongs in a time interval at which the special effects enhancement processing is provided and an average value of a following frame is less than the pre-set value, and may end the special effects enhancement processing if the above is greater than or equal to the pre-set value.

According to one or more embodiments, the processor 130 may end the special effects enhancement processing with a fade out method if the ending of the special effects enhancement processing is determined. For example, the processor 130 may end the special effects enhancement processing with a method of gradually reducing a special effects enhancement processing level from a plurality of frames.

FIG. 8A to FIG. 8D are diagrams illustrating maintaining and ending of providing special effects according to one or more embodiments.

Figure 8A:
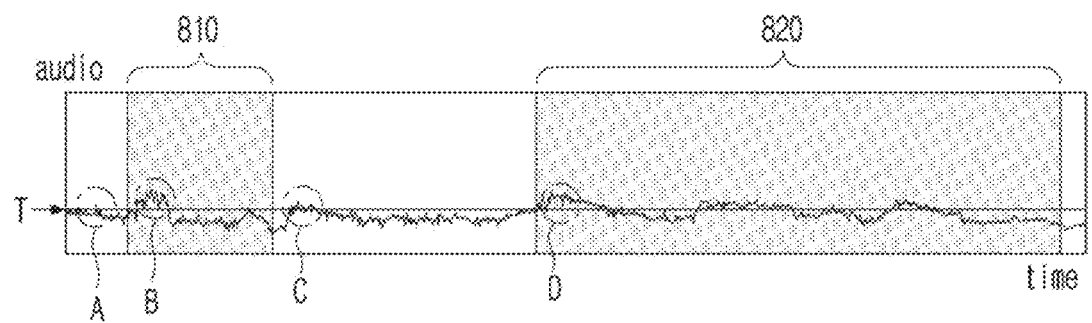
FIG. 8A is a diagram illustrating maintaining and ending of providing special effects according to one or more embodiments.

According to one or more embodiments, the processor 130 may maintain a special effects enhancement state even if a size of an audio signal is lowered to less than the threshold value T in a time interval in which a color histogram of an image frame is satisfied with the special effects being provided. For example, as shown in FIG. 8A, if the color histogram of the image frame is satisfied with the special effects being provided during the first time interval 810, the special effects enhancement state may be maintained even if the size of the audio signal is lowered to less than the threshold value T. For example, in FIG. 8A, although the size of the audio signal at time-point A is less than the threshold value, the size of the audio signal at time-point B, time-point C, and time-point D is identified as greater than or equal to the threshold value.

Figure 8B:
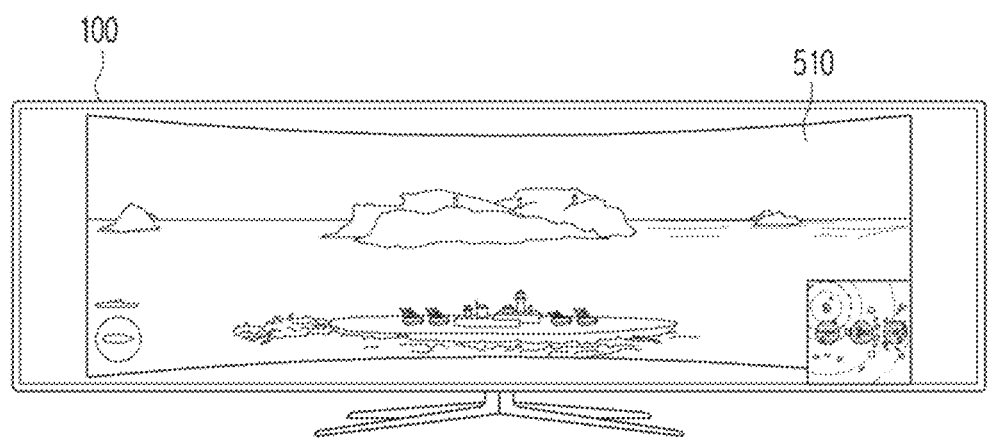
FIG. 8B is a diagram illustrating maintaining and ending of providing special effects according to one or more embodiments.
Figure 8C:
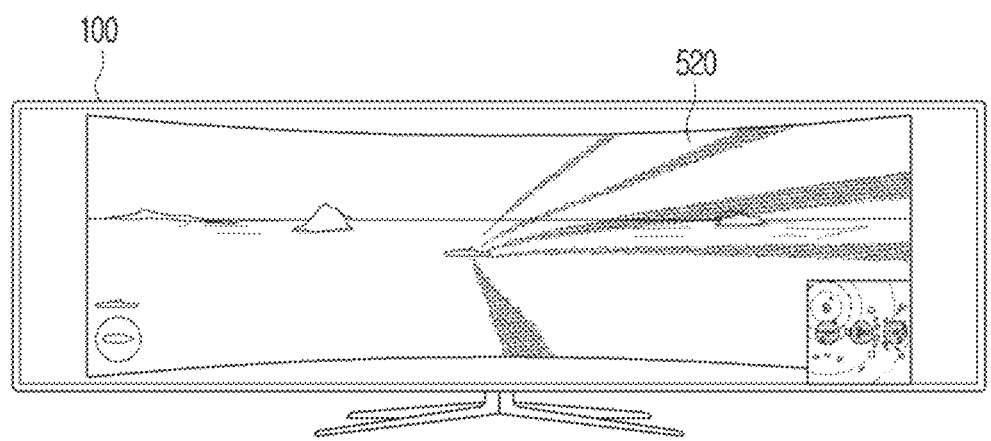
FIG. 8C is a diagram illustrating maintaining and ending of providing special effects according to one or more embodiments.

FIG. 8B shows special effects not being provided to the image frame 510 corresponding to time-point A at which the size of the audio signal is less than the threshold value T, and FIG. 8C shows missile special effects being provided to the image frame 520 corresponding to time-point B at which the size of the audio signal is greater than or equal to the threshold value T. In this case, assuming that the special effects enhancement processing is started at time-point B, and the color histogram of the image frame is satisfied with the special effects being provided during the first time interval 810, the special effects enhancement state may be maintained even if the size of the audio signal is lowered to less than the threshold value T.

Then, if an image corresponding to time-point C at which the size of the audio signal is greater than or equal to the threshold value T is an image in which special effects are not provided as shown in FIG. 8B, the special effects enhancement processing may be ended. For example, the processor 130 may end the special effects enhancement processing when the color histogram of the image frame becomes relatively similar with a color histogram of a frame in which special effects are not provided.

Figure 8D:
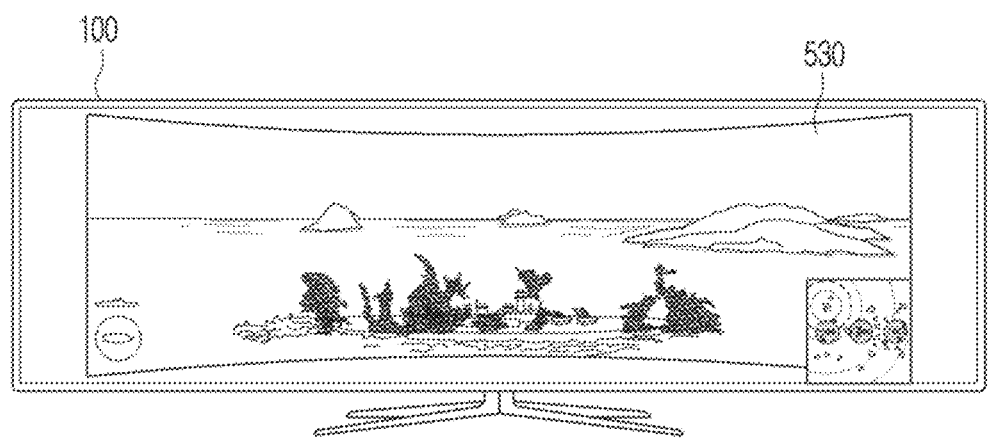
FIG. 8D is a diagram illustrating maintaining and ending of providing special effects according to one or more embodiments.

FIG. 8D shows flame special effects being provided to the image frame 530 corresponding to time-point D at which the size of the audio signal is greater than or equal to the threshold value T. In this case, assuming that the special effects enhancement processing is started at time-point D, and the color histogram of the image frame is satisfied with the special effects being provided during a second time interval 820, the special effects enhancement state may be maintained even if the size of the audio signal is lowered to less than the threshold value T.

Figure 9:
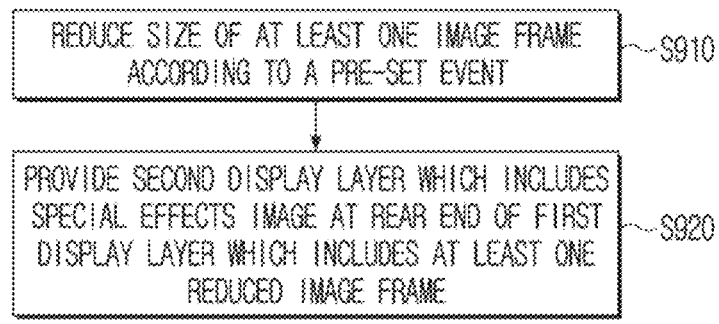
FIG. 9 is a flowchart illustrating a method of enhancing special effects based on image reduction according to one or more embodiments.

FIG. 9 is a flowchart illustrating a method of enhancing special effects based on image reduction according to one or more embodiments.

According to one or more embodiments, the processor 130 may provide by reducing a size of at least one image frame according to a pre-set event (S910).

The processor 130 may control the display 110 for the special effects image to be output to a remaining region (excluding the region displaying the reduced image) of a whole region of the display.

Figure 10:
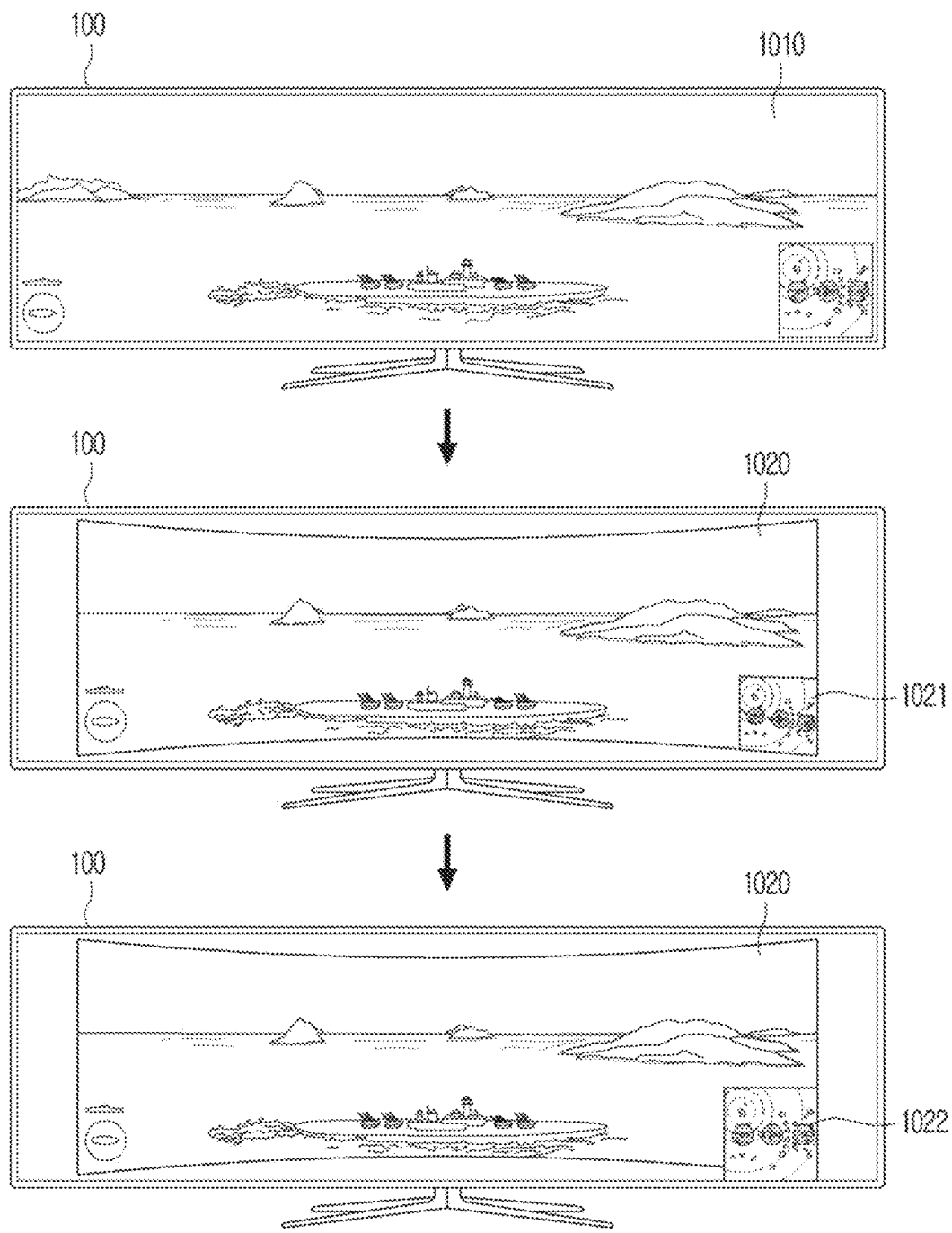
FIG. 10 is a diagram illustrating an image output method according to one or more embodiments.

FIG. 10 is a diagram illustrating an image output method according to one or more embodiments.

According to one or more embodiment, a size of a screen may be adjusted and provided according to a pre-set event. According to one or more examples, if a game content is provided in a large-scale screen, user immersiveness may decline because the screen is too-large. In this case, the size of the screen may be adjusted and provided according to a user command or a user position.

According to one or more examples, a screen may be adjusted and provided in a curved screen form or key information and the like may be enlarged and provided to provide a three-dimensional effect. For example, a screen with immersiveness applied with a curvature like a curved screen may be provided as shown in FIG. 10. In addition, based on key information such as a miniature map (or a mini-map) being enlarged and provided as shown in FIG. 10, a distortion by a curved effect may be corrected.

As described, if the screen size is adjusted and provided, a blank region (e.g., border region) within the screen may be generated. However, the above is not limited thereto, and the blank region such as a letter box (or a black bar) may be generated based on a difference in a horizontal/vertical ratio of a screen and a horizontal/vertical ratio of content.

Figure 11A:
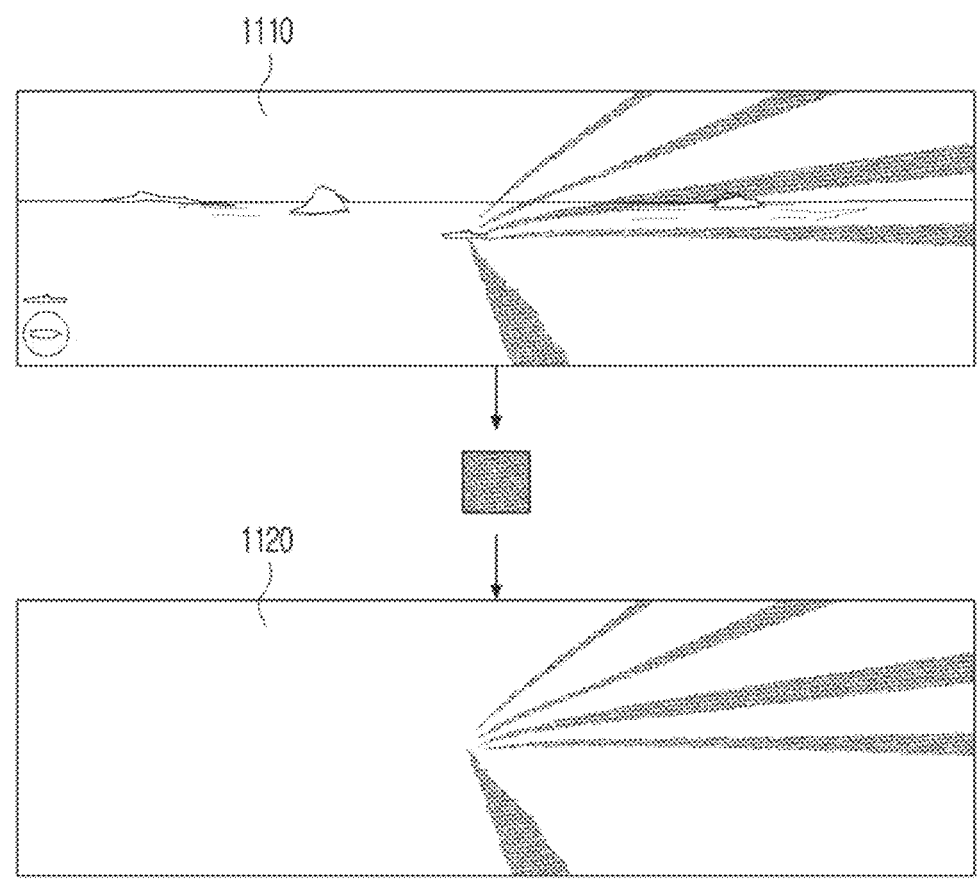
FIG. 11A is a diagram illustrating a method of enhancing special effects based on image reduction according to one or more embodiments.
Figure 11B:
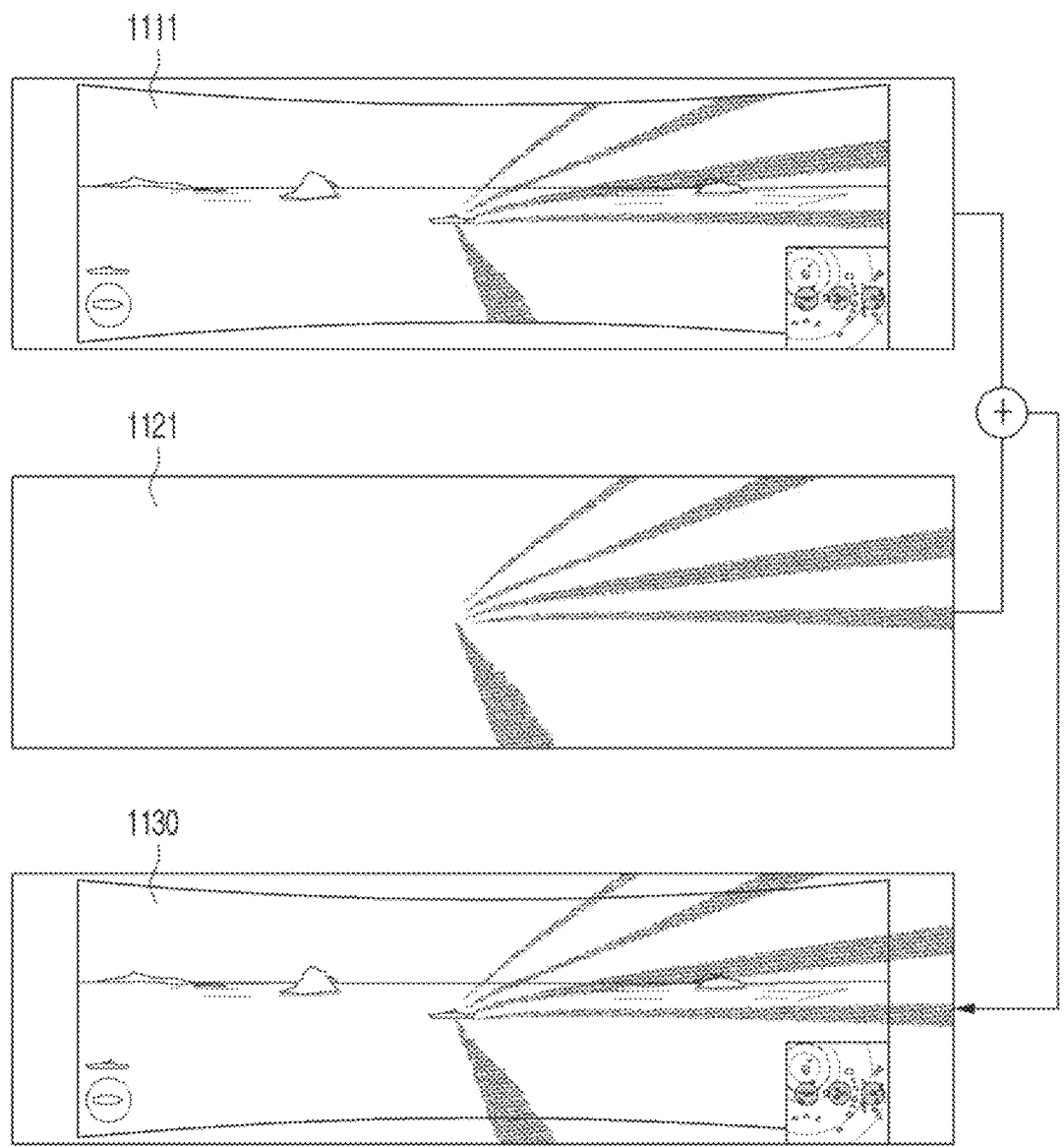
FIG. 11B is a diagram illustrating a method of enhancing special effects based on image reduction according to one or more embodiments.

FIG. 11A and FIG. 11B are diagrams illustrating a method of enhancing special effects based on image reduction according to one or more embodiments.

According to one or more embodiments, the processor 130 may obtain a special effects image based on a specific color included in an image frame 1110.

For example, the processor 130 may obtain a special effects image 1120 by identifying a color corresponding to relevant special effects based on the special effects being provided according to missiles being launched in the image frame 1110 as shown in FIG. 11A. For example, a chroma key synthesis algorithm used in broadcast synthesis and the like may be used as a method of extracting the special effects image based on the identified color, but the embodiment is not limited thereto.

According to one or more examples, if a size of the image frame 1110 is the adjusted image frame (e.g., adjusted in the curved screen form), the special effects image may also be in a form which is adjusted in size. Accordingly, the processor 130 may perform an enlargement scaling for the obtained size of the special effects image to correspond to the screen size of the display 110. For example, the processor 130 may enlarge the special effects image until the special effects image becomes the same size as the screen size, that is, an output frame based on a center of a frame which includes the reduced image.

The processor 130 may provide an output image 1130 by providing the second display layer which includes a special effects image 1121 at the rear end of the first display layer which includes a reduced image 1111.

According to one or more examples, the processor 130 may obtain an output image by alpha blending the image which includes the reduced image region and the special effects image. Here, alpha blending may refer to a method in which a background RGB value and an RGB value over the background RGB value are mixed by allocating a new value Alpha A to a color value RGB so as to provide a transparent see-through effect when another image is overlapped over an image.

For example, an Alpha value may be classified as a value between 0 and 255 or a value between 0.0 and 1.0, in which 0 may refer to being completely transparent, and 255 which is the opposite thereof (or highest value such as 1.0) refers to being fully opaque. Alternatively, 0 may refer to being fully opaque, and 255 which is the opposite thereof (or highest value such as 1.0) may refer to being completely transparent. For example, assuming that an 8 bit is allocated to the Alpha value and a value from 0 to 255 may be represented, a corresponding pixel ratio may become higher as the corresponding value increases and the corresponding pixel ratio may become lower as the corresponding value decreases. According to one or more examples, if an image I1 which includes the reduced image region and a special effects image I2 are mixed, a mixing operation may be represented with equations such as I1*Alpha+I2*(1-Alpa) or I1*(1-Alapha)+I2*Alpha or I1*Alpa+I2, and the like. For example, based on increasing transparency of the remaining region excluding the image region being increased in the image which includes the reduced image region, the special effects image which is provided at the rear end thereof may be displayed at the corresponding region.

According to one or more examples, an enlargement scaling may be used because the special effects image is smaller than the screen size of the display 110 for being obtained from the reduced image. Accordingly, when mixing each image using alpha blending, mixing may be performed by using an upscaled Alpha value after upscaling the Alpha value corresponding to the special effects image. For example, in the upscaling of the Alpha value, at least one scaling technique (or an interpolation technique) of a polyphase scaling (or a polyphase interpolation), a trilinear scaling (or a trilinear interpolation), a linear scaling (or a linear interpolation), or a bilinear scaling (or a bilinear interpolation), may be used.

Figure 12A:
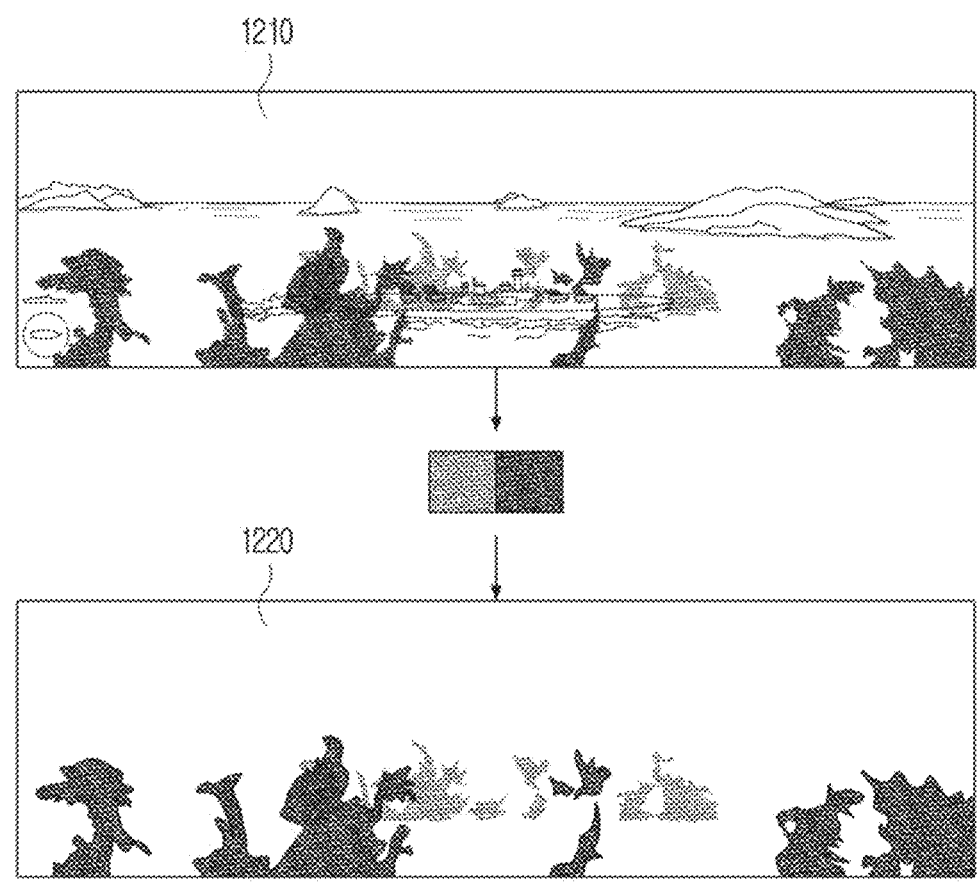
FIG. 12A is a diagram illustrating a method of enhancing special effects based on image reduction according to one or more embodiments.
Figure 12B:
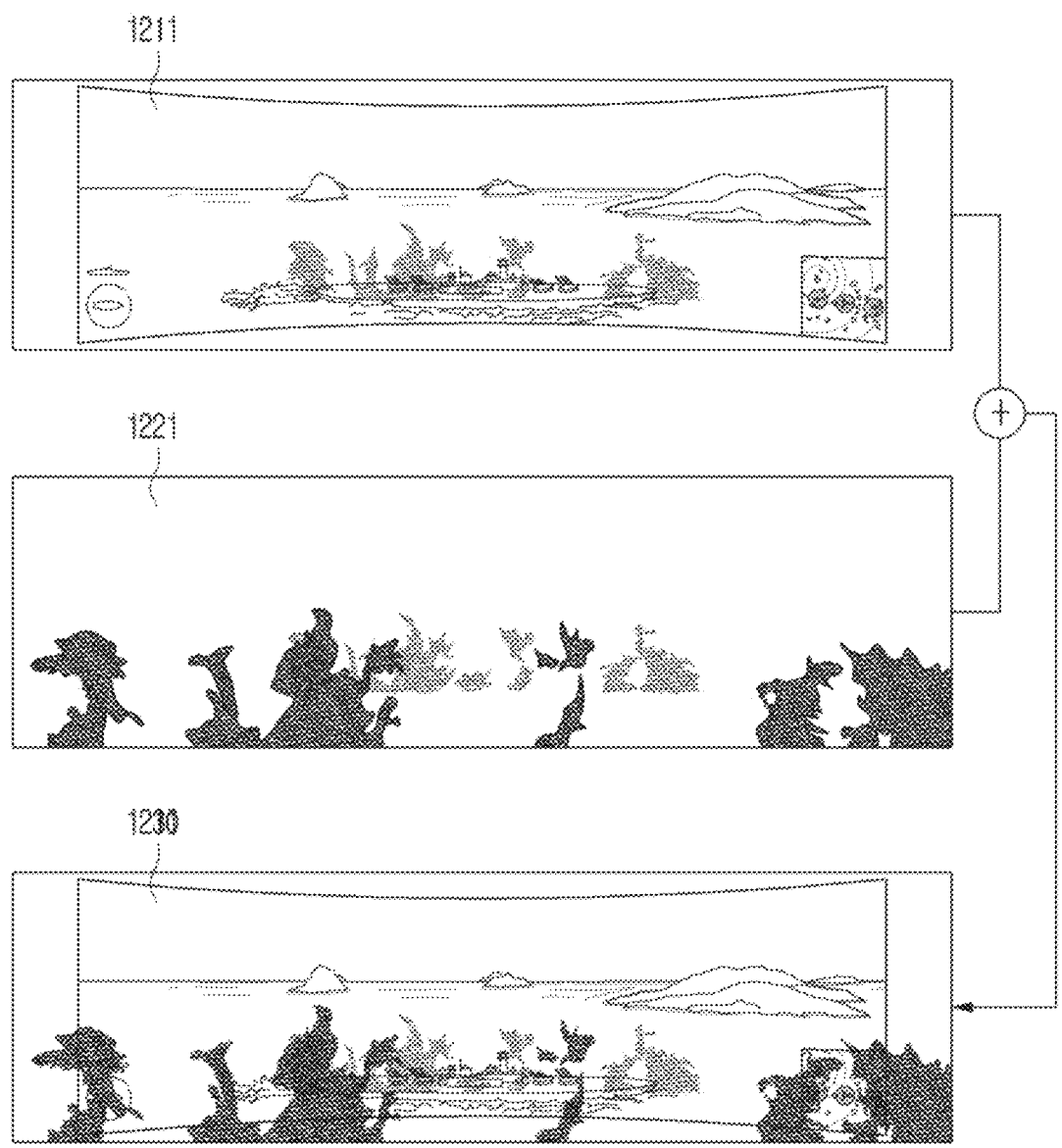
FIG. 12B is a diagram illustrating a method of enhancing special effects based on image reduction according to one or more embodiments.

FIG. 12A and FIG. 12B are diagrams illustrating a method of enhancing special effects based on image reduction according to one or more embodiments.

According to one or more embodiments, the processor 130 may obtain the special effects image based on a plurality of specific colors included in an image frame 1210.

For example, the processor 130 may obtain, based on special effects according to flames being provided in the image frame 1210 as shown in FIG. 12A, a special effects image 1220 by identifying a plurality of colors corresponding to the relevant special effects.

According to one or more examples, if a size of the image frame 1210 is the adjusted image frame (e.g., adjusted in the curved screen form), the special effects image may also be in a form which is adjusted in size. Accordingly, the processor 130 may perform enlargement scaling for the obtained size of the special effects image to correspond to the screen size of the display 110. For example, the processor 130 may enlarge the special effects image until the special effects image becomes the same size as the screen size, that is, the output frame based on the center of the frame which includes the reduced image.

The processor 130 may provide an output image 1230 by providing the second display layer which includes a special effects image 1221 at the rear end of the first display layer which includes a reduced image 1211.

Figure 13:
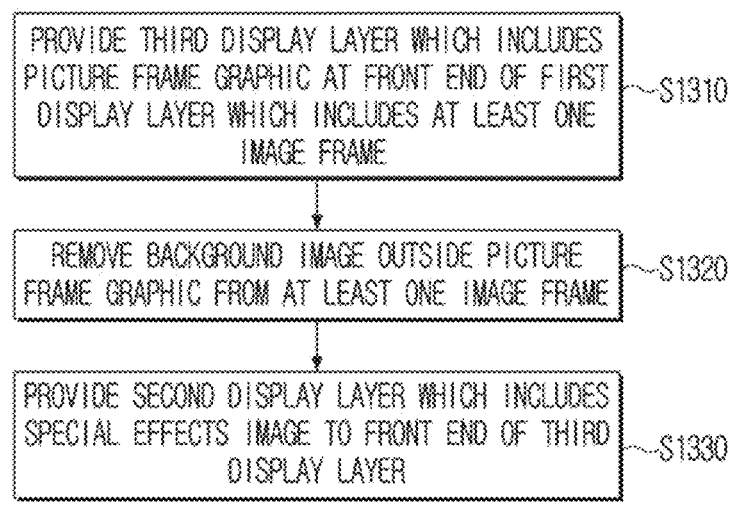
FIG. 13 is a flowchart illustrating a processing method enhancing special effects using a picture frame according to one or more embodiments.

FIG. 13 is a flowchart illustrating a processing method enhancing special effects using a picture frame according to one or more embodiments.

According to one or more embodiments, the processor 130 may provide a third display layer which includes a frame graphic at a front end of the first display layer which includes at least one image frame (S1310).

The processor 130 may remove a background image outside the frame graphic from the at least one image frame (S1320).

The processor 130 may provide the second display layer which includes the special effects image at a front end of the third display layer (S1330).

Figure 14:
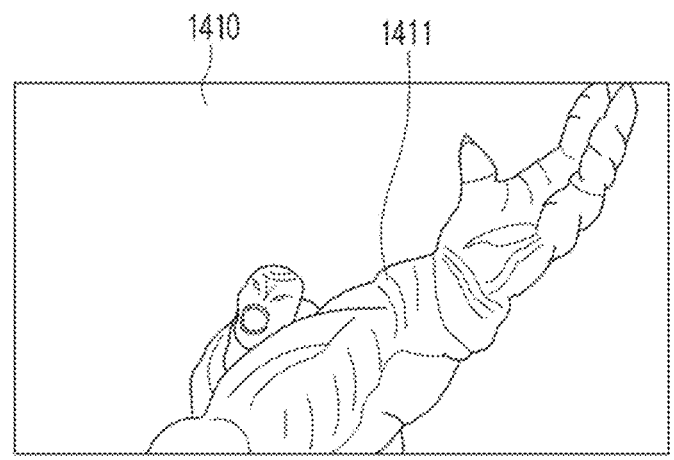
FIG. 14 is a diagram illustrating a processing method enhancing special effects using a picture frame according to one or more embodiments.
Figure 14:
Figure 14:
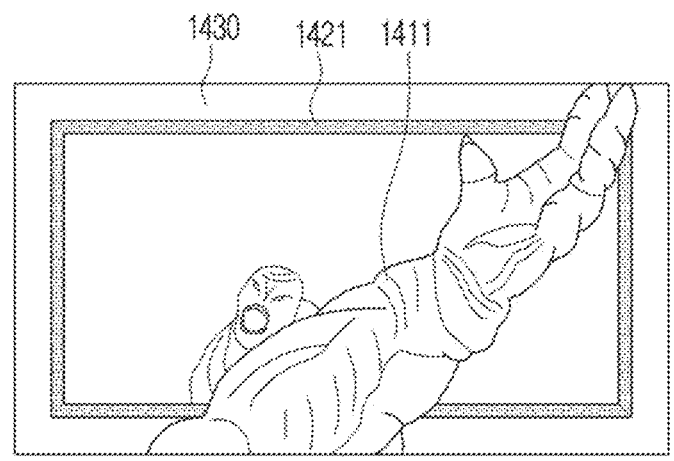

FIG. 14 is a diagram illustrating a processing method enhancing special effects using a picture frame according to one or more embodiments.

According to one or more embodiments, the processor 130 may obtain the special effects image based on a specific color included in an image frame 1410. For example, the processor 130 may obtain, based on special effects corresponding to a monster hand being provided in the image frame 1410 as shown in FIG. 14, a special effects image which includes the monster hand by identifying a color corresponding to the relevant special effects.

In addition, the processor 130 may remove the background image outside a virtual frame graphic 1421 from the image frame 1410 while providing the virtual frame graphic 1421.

Then, the processor 130 may provide an image 1430 with immersiveness by providing a frame which includes the special effects image, a frame which includes the frame graphic, and an image frame with the background image removed at a front end layer, a center layer, and a rear end layer, respectively.

Figure 15:
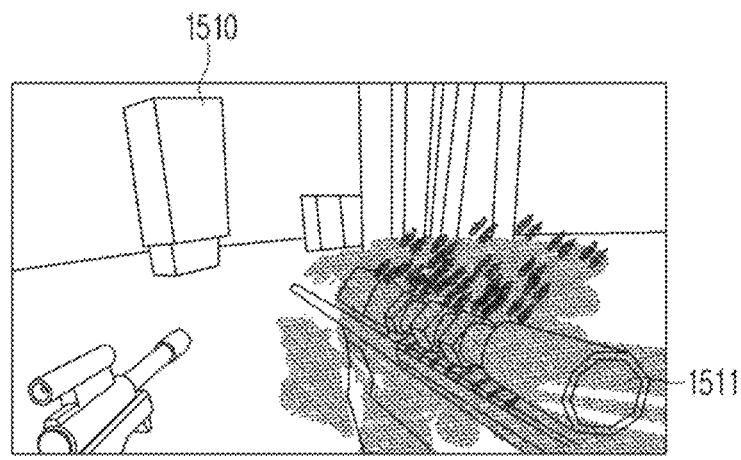
FIG. 15 is a diagram illustrating a processing method enhancing special effects using a picture frame according to one or more embodiments.
Figure 15:
Figure 15:
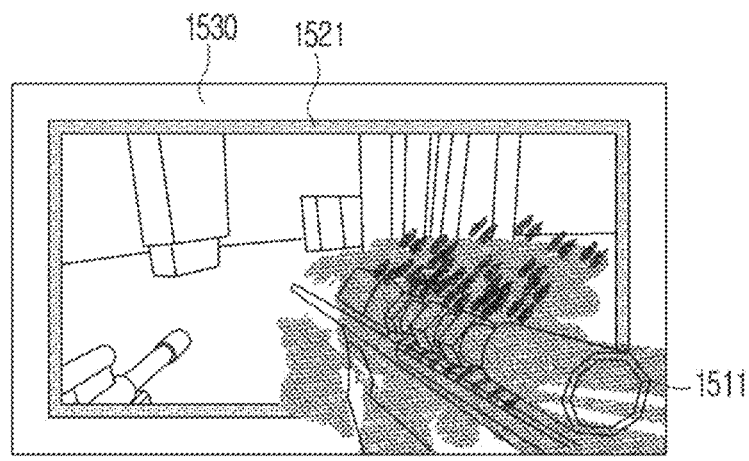

FIG. 15 is a diagram illustrating a processing method enhancing special effects using a picture frame according to one or more embodiments.

According to one or more embodiments, the processor 130 may obtain the special effects image based on the plurality of specific colors included in an image frame 1510. For example, the processor 130 may obtain, based on special effects corresponding to guns being provided in the image frame 1510 as shown in FIG. 15, the special effects image which includes the guns by identifying the plurality of colors corresponding to the relevant special effects.

In addition, the processor 130 may remove the background image outside a virtual frame graphic 1521 from the image frame 1510 while providing the virtual frame graphic 1521.

Then, the processor 130 may provide an image 1530 with immersiveness by providing the frame which includes the special effects image, the frame which includes the frame graphic, and the image frame with the background image removed at the front end layer, the center layer, and the rear end layer, respectively.

Figure 16:
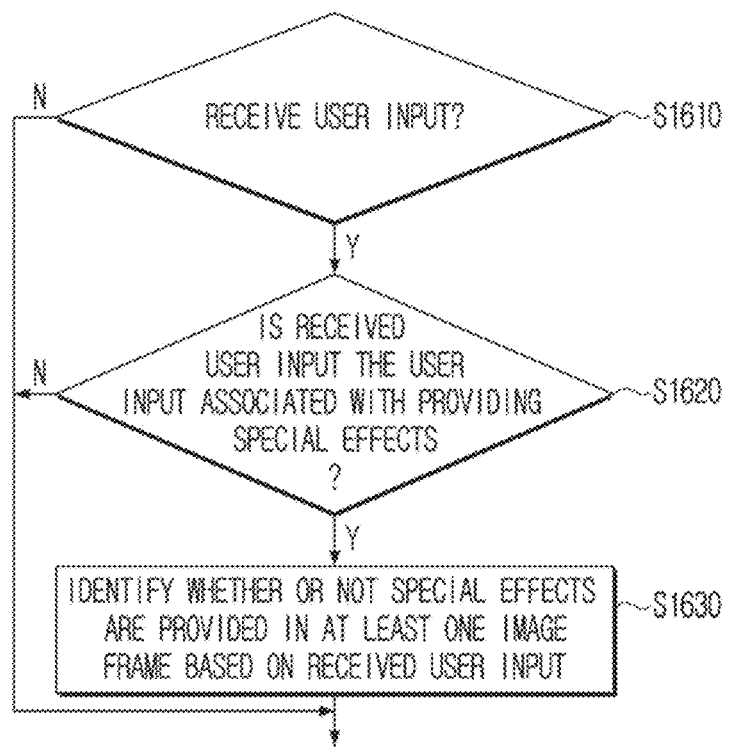
FIG. 16 is a flowchart illustrating an identification method of whether or not special effects are provided based on a user input according to one or more embodiments.

FIG. 16 is a flowchart illustrating an identification method of whether or not special effects are provided based on a user input according to one or more embodiments.

According to one or more embodiments, the processor 130 may identify, based on the user input being received (S1610: Y), whether or not the received user input is a user input associated with providing special effects (S1620). According to one or more examples, a user input of a pre-set type may be identified as the user input associated with providing special effects. For example, a user input which uses weapons such as missiles, guns, knives, and the like in a game content may be identified as the user input associated with providing special effects.

Then, the processor 130 may identify, based on the received user input being identified as the user input associated with providing special effects (S1620: Y), whether or not special effects are provided in at least one image frame based on the received user input (S1630). According to one or more examples, the processor 130 may determine whether or not special effects are provided in the image frame if the user input associated with providing special effects is identified. That is, the processor 130 may determine whether or not special effects are provided in the image frame based on the user input associated with providing the special effects being identified even if the size of the audio signal is not greater than or equal to the threshold value. According to another example, a type of special effects may be identified based on the user input associated with providing special effects being identified, and immediately identifying the color corresponding to the special effects of the relevant type in the image frame may also be possible. For example, the processor 130 may identify, based on a user input associated with a missile launch being identified, the color corresponding to the special effects associated with the missile launch based on pre-stored information, and obtain the special effects image corresponding to the identified color in the image frame.

According to one or more embodiments, sensitivity, a special effects enhancement intensity, and the like for determining whether or not special effects are provided may be set according to the user input. For example, a threshold value of an audio signal, a threshold value of a color histogram, and the like for determining whether or not special effects are provided may be set or changed according to the user input. For example, a pixel value increase extent, a size of a special effects enhancement region, and the like for enhancing special effects may be set or changed according to the user input.

Figure 17:
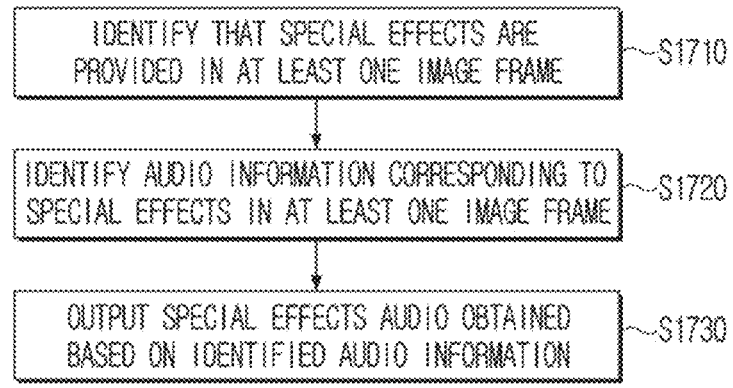
FIG. 17 is a flowchart illustrating a method of enhancing audio special effects according to one or more embodiments.

FIG. 17 is a flowchart illustrating a method of enhancing audio special effects according to one or more embodiments.

According to one or more embodiments, the processor 130 may identify, based on identifying that special effects are provided in at least one image frame (S1710), audio information corresponding to the special effects in the at least one image frame (S1720).

The processor 130 may output a special effects audio obtained based on the identified audio information through the speaker 170 (S1730). Here, the special effects audio may be an audio identified from an audio signal or a pre-stored audio. For example, audio effects corresponding to the type of special effects (e.g., missiles, guns, etc.) may be pre-stored.

According to one or more examples, the processor 130 may output the special effects audio so as to be enhanced compared to other audios. For example, the processor 130 may output the special effects audio to be louder compared to other audios, or to be enhanced compared to other audios through sound processing such as an equalizer processing.

According to one or more embodiments, the special effects audio may be provided together with an enhancement processing of the special effects image. However, the above is not limited thereto, and only the special effects audio may be provided even if the enhancement processing of the special effects image is not provided.

Figure 18:
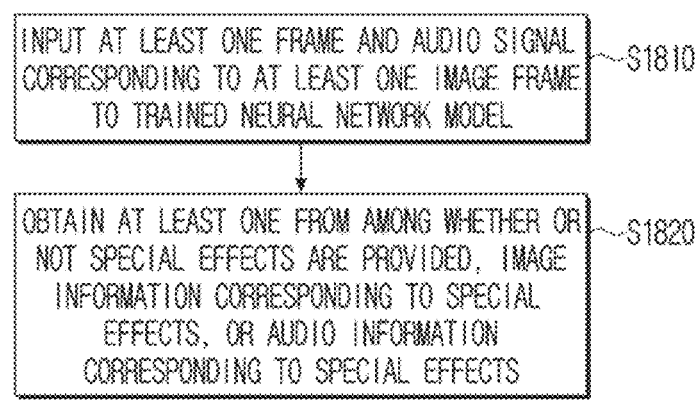
FIG. 18 is a flowchart illustrating an identification method of whether or not special effects are provided using a neural network model according to one or more embodiments.

FIG. 18 is a flowchart illustrating an identification method of whether or not special effects are provided using a neural network model according to one or more embodiments.

According to one or more embodiments, the processor 130 may input at least one frame and an audio signal corresponding to the at least one image frame to at least one trained neural network model (S1810), and obtain at least one of whether or not special effects are provided, image information corresponding to the special effects, or audio information corresponding to the special effects (S1820).

According to one or more examples, the at least one trained neural network model may be trained for at least one of whether or not special effects are provided, image formation corresponding to the special effects, or audio information corresponding to the special effects to be obtained by learning the size of the audio signal and a change in color.

In one or more examples, the at least one neural network model may include a plurality of neural network models trained to respectively output whether or not special effects are provided and image information corresponding to the special effects. In another example, the at least one neural network model may include the plurality of neural network models trained to respectively output whether or not special effects are provided, image information corresponding to the special effects, and audio information corresponding to the special effects. In another example, the at least one neural network model may include a neural network model trained to output whether or not special effects are provided and a neural network model trained to output image information and audio information corresponding to the special effects. In still another example, the at least one neural network model may include a neural network model trained to output whether or not special effects are provided and image information corresponding to the special effects and a neural network model trained to output audio information corresponding to the special effects.

Here, learning (or training) refers to a pre-defined operation rule or a neural network model of a desired feature being created by applying a learning algorithm to a plurality of learning data. The above-described learning may be carried out in a device itself in which an artificial intelligence according to the disclosure is performed, or carried out through a separate server or system. The neural network model may be formed of a plurality of neural network layers. At least one layer may have at least one weight value, and perform a computation of a layer through a computation result of a previous layer and at least one defined computation. Examples of the neural network may include a Convolutional Neural Network (CNN), a Recurrent Neural Network (RNN), a Deep Neural Network (DNN), a Restricted Boltzmann Machine (RBM), a Deep Belief Network (DBN), a Bidirectional Recurrent Deep Neural Network (BRDNN), a Deep-Q Networks, and a Transformer, and the neural network of the disclosure is not limited to the above-described examples, unless otherwise specified.

The learning algorithm may be a method for training a predetermined target device using a plurality of learning data and having the predetermined target device to make decisions or predictions on its own. Examples of the learning algorithm may include a supervised learning, an unsupervised learning, a semi-supervised learning, or a reinforcement learning, and the learning algorithm in the disclosure is not limited to the above-described examples unless otherwise specified. For example, the neural network model may be trained based on a database which includes content identification information, colors corresponding to the special effects, and sounds corresponding to the special effects. Data stored in the database may be data collected from a plurality of user terminals. For example, the neural network model may be trained using an image frame (and/or an audio signal) in which the special effects are generated and labeling corresponding to the special effects being provided as input and output learning data, and an image frame (and/or an audio signal) in which the special effects are not generated and labeling corresponding to the special effects not being provided as input and output learning data, respectively. For example, the neural network model may be trained using the image frame (and/or the audio signal) in which the special effects are generated and the special effects image (and/or the special effects sound) as input data and output data.

According to one or more embodiments, the electronic apparatus 100 may transmit at least one of image information, or audio information corresponding to the special effects identified in the at least one image frame with information on content, to an external apparatus. According to one or more examples, the information on content may include content identification information, information on a playback time-point at which the special effects are provided, the special effects image and/or the audio information.

In this case, the external apparatus, for example, a server which manages content may manage the providing of the special effects to other electronic apparatuses based on the received information. The server may manage time-points at which the special effects are provided per content, the special effect images and sounds being provided, and the like based on the received information (i.e., a special effects providing history) and provide the corresponding information to other electronic apparatuses.

For example, the other electronic apparatus may provide the special effects enhancement processing based on information (e.g., information on the playback time-point at which the special effects are provided, special effects image and/or audio information) received from the server.

According to one or more embodiments, a depth value of an object may be identified based on a depth map corresponding to content, and an image with increased three-dimensional effect may be provided by providing a plurality of objects at different display layers based on the depth value of the object. For example, although the special effects has been identified as being provided in the image frame, if it is difficult to identify the special effects image based on color, the special effects image may be obtained by using the depth map.

According to one or more embodiments, at least a portion of the processing associated with whether or not the special effects are provided and the obtaining of the special effects may be performed in the server. According to one or more examples, a feature point associated with the generating of special effects may be identified in the server.

For example, the electronic apparatus 100 may transmit content stream to the server, and receive a special effects enhancement processed image (and/or audio) from the server and output the received image. For example, if a decoded video or audio is transmitted to the server, there may be a burden in transmission according to data amount and therefore, the content stream prior to decoding may be transmitted to the server.

According to one or more embodiments, content provider may provide information on time-points at which the special effects are provided, a method of providing the special effects, a form by which the special effects are provided, and the like through metadata and the like, and in this case, the electronic apparatus 100 may perform the special effects enhancement processing based on the relevant information.

According to the various embodiments described above, by extracting the special effects from the content, and providing by enhancing the extracted special effects, content with enhanced immersiveness and three-dimensional effect may be provided. In addition, a UX experience of the user may be enhanced by using software graphic computations without special hardware to provide a three-dimensional effect.

Meanwhile, methods according to the various embodiments of the disclosure described above may be implemented with only a software upgrade or a hardware upgrade for electronic apparatuses of the related art.

In addition, the various embodiments of the disclosure described above may be performed through an embedded server provided in an electronic apparatus, or an external server of the electronic apparatus.

According to one or more embodiments of the disclosure, the various embodiments described above may be implemented with software including instructions stored in a machine-readable storage media (e.g., computer). The machine may call an instruction stored in the storage medium, and as an apparatus operable according to the called instruction, may include an electronic apparatus (e.g., electronic apparatus (A)) according to the above-mentioned embodiments. Based on a command being executed by the processor, the processor may directly or using other elements under the control of the processor perform a function corresponding to the command. The command may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments of the disclosure, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be stored at least temporarily in the storage medium such as a server of a manufacturer, a server of an application store, or a memory of a relay server, or temporarily generated.

In addition, each of the elements (e.g., a module or a program) according to various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While certain embodiments of the disclosure has been particularly shown and described, it will be understood that various changes in form and details may be made therein without departing from the spirit and scope of the following claims.

What is claimed is:

1. An electronic apparatus comprising:
a display;
at least one memory storing at least one instruction; and
at least one processor operatively connected with the display and the at least one memory,
wherein the at least one processor is configured to execute the at least one instruction to:
based on a size of an audio signal corresponding to at least one image frame of content being identified as greater than or equal to a threshold value, identify whether special effects are provided based on pixel information of the at least one image frame,
based on identifying that the special effects are provided in the at least one image frame, identify image information corresponding to the special effects in the at least one image frame, and
output a special effects image obtained based on the image information together with the at least one image frame through the display.

2. The electronic apparatus of claim 1, wherein the at least one processor is further configured to execute the at least one instruction to:
based on the at least one image frame being displayed in a region smaller than a total area of the display, control the display to output the special effects image in a remaining region of the display excluding the region in which the at least one image frame is displayed.

3. The electronic apparatus of claim 2, wherein the at least one processor is further configured to execute the at least one instruction to:
control the display to:
provide a first display layer comprising the at least one image frame, and
provide a second display layer comprising the special effects image at a rear end of the first display layer.

4. The electronic apparatus of claim 1, wherein the at least one processor is further configured to execute the at least one instruction to control the display to:
provide a first display layer comprising the at least one image frame,
provide a third display layer comprising a frame graphic at a front end of the first display layer, remove a background image outside the frame graphic from the at least one image frame, and provide a second display layer comprising the special effects image at a front end of the third display layer.

5. The electronic apparatus of claim 1, further comprising:
a user interface,
wherein the at least one processor is further configured to execute the at least one instruction to:
based on a user input being received through the user interface, identify whether the user input is associated with providing the special effects, and
based on the user input being identified as associated with providing the special effects, identify whether the special effects are provided in the at least one image frame based on the user input.

6. The electronic apparatus of claim 1, wherein the at least one processor is further configured to execute the at least one instruction to:
obtain color histogram information based on the pixel information,
obtain histogram difference information by comparing the color histogram information with reference color histogram information, and
identify at least one of whether the special effects are provided, or the image information, based on the histogram difference information.

7. The electronic apparatus of claim 1, further comprising:
a speaker,
wherein the at least one processor is further configured to execute the at least one instruction to:
based on identifying that the special effects are provided in the at least one image frame, identify audio information corresponding to the special effects in the at least one image frame, and
output special effects audio through the speaker based on the audio information.

8. The electronic apparatus of claim 1, wherein the at least one processor is further configured to execute the at least one instruction to:
obtain at least one of whether the special effects are provided, the image information, or audio information corresponding to the special effects, by inputting the at least one image frame and the audio signal corresponding to the at least one image frame to a trained neural network model, and
wherein the trained neural network model is trained for at least one of whether the special effects are provided, the image information, or the audio information, to be obtained by learning the size of the audio signal and a change in color.

9. The electronic apparatus of claim 1, wherein the at least one processor is further configured to execute the at least one instruction to:
identify whether the special effects are maintained or ended in at least one following frame based on a difference between the pixel information and pixel information of the at least one following frame; and identify a frame interval in which the special effects image is provided based on whether the special effects are maintained or ended.

10. The electronic apparatus of claim 1, further comprising:
a communication interface,
wherein the at least one processor is further configured to execute the at least one instruction to:
transmit at least one of the image information or audio information corresponding to the special effects, together with information on the content, to an external apparatus through the communication interface, and
wherein the information on the content comprises identification information on the content and information on a playback time-point at which the special effects are provided.

11. An image output method of an electronic apparatus, the method comprising:
based on a size of an audio signal corresponding to at least one image frame of content being identified as greater than or equal to a threshold value, identifying whether special effects are provided based on pixel information of the at least one image frame;
based on identifying that the special effects are provided in the at least one image frame, identifying image information corresponding to the special effects in the at least one image frame; and
outputting a special effects image obtained based on the image information together with the at least one image frame.

12. The method of claim 11, wherein the outputting together with the at least one image frame comprises:
based on the at least one image frame being displayed in a region smaller than a total area of the display, outputting the special effects image in a remaining region of the display excluding the region in which the at least one image frame is displayed.

13. The method of claim 12, wherein the outputting together with the at least one image frame comprises:
providing a first display layer comprising the at least one image frame; and
providing a second display layer comprising the special effects image displayed at a rear end of the first display layer.

14. The method of claim 11, wherein the outputting together with the at least one image frame comprises:
providing a first display layer comprising the at least one image frame;
providing a third display layer comprising a frame graphic at a front end of the first display layer;
removing a background image outside the frame graphic from the at least one image frame; and
providing a second display layer comprising the special effects image at a front end of the third display layer.

15. A non-transitory computer-readable medium configured to store computer instructions for an electronic apparatus to perform an operation when executed by a processor of the electronic apparatus, the operation comprising:
based on a size of an audio signal corresponding to at least one image frame of content being identified as greater than or equal to a threshold value, identifying whether special effects are provided based on pixel information of the at least one image frame;
based on identifying that the special effects are provided in the at least one image frame, identifying image information corresponding to the special effects in the at least one image frame; and
outputting a special effects image obtained based on the image information together with the at least one image frame.

16. The non-transitory computer-readable medium of claim 15, wherein the outputting together with the at least one image frame comprises:
based on the at least one image frame being displayed in a region smaller than a total area of a display, outputting the special effects image in a remaining region of the display excluding the region in which the at least one image frame is displayed.

17. The non-transitory computer-readable medium of claim 16, wherein the outputting together with the at least one image frame comprises:
providing a first display layer comprising the at least one image frame; and
providing a second display layer comprising the special effects image at a rear end of the first display layer.

18. The non-transitory computer-readable medium of claim 15, wherein the outputting together with the at least one image frame comprises:
providing a first display layer comprising the at least one image frame;
providing a third display layer comprising a frame graphic at a front end of the first display layer;
removing a background image outside the frame graphic from the at least one image frame; and
providing a second display layer comprising the special effects image at a front end of the third display layer.

19. The non-transitory computer-readable medium of claim 15, wherein the operation further comprises:
obtaining color histogram information based on the pixel information;
obtaining histogram difference information by comparing the color histogram information with reference color histogram information; and
identifying at least one of whether the special effects are provided, or the image information, based on the histogram difference information.

20. The non-transitory computer-readable medium of claim 15,
wherein the operation further comprises:
obtaining at least one of whether the special effects are provided, the image information, or audio information corresponding to the special effects, by inputting the at least one image frame and the audio signal corresponding to the at least one image frame to a trained neural network model, and
wherein the trained neural network model is trained for at least one of whether the special effects are provided, the image information, or the audio information, to be obtained by learning the size of the audio signal and a change in color.

* * * * *